US008532197B2

(12) United States Patent
Lareau et al.

(10) Patent No.: US 8,532,197 B2
(45) Date of Patent: Sep. 10, 2013

(54) METHODS AND SYSTEMS FOR DETECTING TEMPORALLY OSCILLATING SOURCES IN VIDEO SIGNALS USING A RECURSIVE INFINITE IMPULSE RESPONSE (IIR) FILTER TECHNIQUE

(75) Inventors: Jonathan Joseph Lareau, Haymarket, VA (US); Andrew James Gallagher, Haymarket, VA (US)

(73) Assignee: The Aerospace Corporation, El Segundo, CA (US)

( * ) Notice: Subject to any disclaimer, the term of this patent is extended or adjusted under 35 U.S.C. 154(b) by 849 days.

(21) Appl. No.: 12/706,491

(22) Filed: Feb. 16, 2010

(65) Prior Publication Data

US 2011/0200120 A1    Aug. 18, 2011

(51) Int. Cl.
*H04N 7/12*    (2006.01)

(52) U.S. Cl.
USPC ............... 375/240.26; 375/240.29; 382/265; 348/208.1

(58) Field of Classification Search
USPC ................. 375/240.26, 240.29; 382/265
See application file for complete search history.

(56) References Cited

U.S. PATENT DOCUMENTS

| | | | | |
|---|---|---|---|---|
| 4,933,765 | A  * | 6/1990 | Schiff et al. | 348/474 |
| 5,163,050 | A | 11/1992 | Cromack | |
| 6,343,304 | B1 | 1/2002 | Yang et al. | |
| 7,649,549 | B2 * | 1/2010 | Batur | 348/208.6 |
| 2007/0286499 | A1 * | 12/2007 | Freiburg et al. | 382/229 |
| 2009/0122866 | A1 * | 5/2009 | Crawford et al. | 375/240.16 |
| 2010/0238354 | A1 * | 9/2010 | Shmueli et al. | 348/607 |
| 2011/0176014 | A1 * | 7/2011 | Hong et al. | 348/208.4 |

OTHER PUBLICATIONS

G Goertzel. An algorithm for the evaluation of finite trigonomentric series. *The American Mathematical Monthly.*, 1958.
P. Mock. *Add DTMF Generation and Decoding to DSP-muP Designs, EDN*, Mar. 21, 1985.
*DSP Applications with the TMS320 Family*, vol. 1. Texas Instruments, 1989.
T. Maeno, M. Akiba, N. Hiromoto, and T. Takada. Two-dimensional lock-in amplifier systems for microscopic imaging. Instrumentation and Measurement Technology Conference, 1994. IMTC/94. Conference Proceedings. 10th Anniversary. Advanced Technologies in I & M., *1994 IEEE*, pp. 536-539 vol. 2, May 1994.
M. Nakanishi and Y. Sakamoto. Analysis of first-order feedback loop with lock-in amplifier. *Circuits and Systems II: Analog and Digital Signal Processing, IEEE Transactions on*, 43(8):570-576, Aug. 1996.

(Continued)

*Primary Examiner* — Jayanti K. Patel
*Assistant Examiner* — Jessica Prince
(74) *Attorney, Agent, or Firm* — Henricks, Slavin & Holmes LLP

(57) ABSTRACT

A method for detecting a temporally oscillating source in digital video signals includes: using an imaging device to capture a sequence of input images of a scene; generating digital video signals from the sequence of input images; and processing the digital video signals using a recursive Infinite Impulse Response (IIR) filter technique based on a differentiated version of Goertzel's Algorithm to detect a temporally oscillating source in the digital video signals. In various embodiments, the method also includes generating a visual display of the scene including one or more graphical elements at least one of which pertains to a detected temporally oscillating source.

83 Claims, 17 Drawing Sheets

(56) References Cited

OTHER PUBLICATIONS

R. Westwater and B. Furht. Three-dimensional dct video compression technique based on adaptive quantizers. *Engineering of Complex Computer Systems, 1996. Proceedings., Second IEEE International Conference on*, pp. 189-198, Oct. 1996.

R. Beck, A.G. Dempster, and I. Kale. Finite-precision goertzel filters used for signal tone detection. *Circuits and Systems II: Analog and Digital Signal Processing, IEEE Transactions on*, 48(7):691-700, Jul. 2001.

Daniel Zwillinger. *CRC Standard Mathematical Tables and Formulae, 31st Edition (CRC Standard Mathematical Tables and Formulae)*. Chapman & Hall/CRC, 2002.

D.-S. Ly-Gagnon, S. Tsukamoto, K. Katoh, and K. Kikuchi. Coherent detection of optical quadrature phase-shift keying signals with carrier phase estimation. *Lightwave Technology, Journal of*, 24(1): 12-21, Jan. 2006.

Wenwen Liang, Mingxin Qin, Mingke Jiao, HaoYang, Ke Li, Teng Jiao, Liyuan Bai, and Wenyong Wang. Phase detection based on the lock-in amplifier sr844 and experiments of brain neuron cells in mit system. *BioMedical Engineering and Informatics, 2008. BMEI 2008. International Conference on*, 1:638-642, May 2008.

W.D. Walker. Sub-microdegree phase measurement technique using lock-in amplifiers. *Frequency Control Symposium, 2008 IEEE International*, pp. 825-828, May 2008.

\* cited by examiner

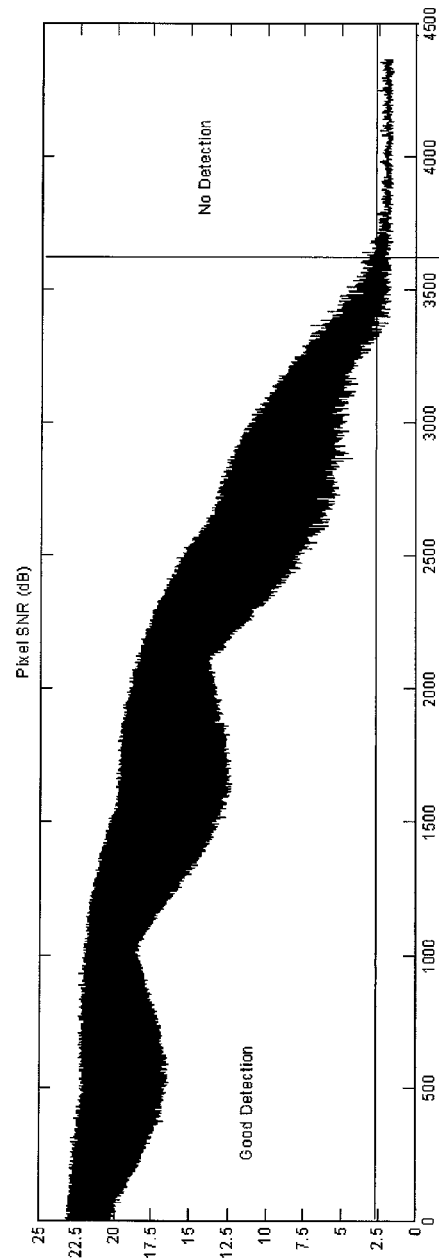
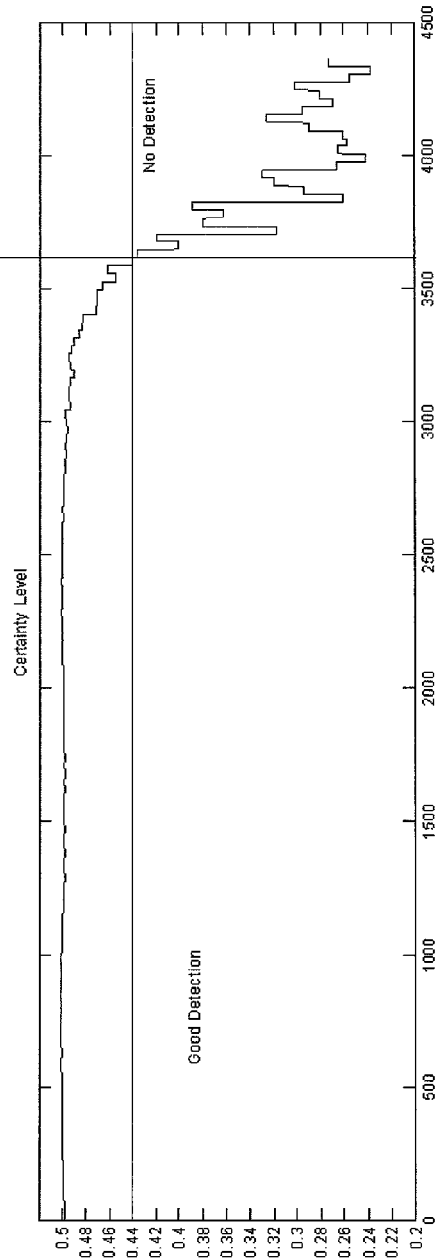
FIG. 11A
FIG. 11B

METHODS AND SYSTEMS FOR DETECTING TEMPORALLY OSCILLATING SOURCES IN VIDEO SIGNALS USING A RECURSIVE INFINITE IMPULSE RESPONSE (IIR) FILTER TECHNIQUE

TECHNICAL FIELD

The invention relates generally to detecting scene content in video signals and, in particular, to methods and systems for detecting temporally oscillating sources in digital video signals using a recursive Infinite Impulse Response (IIR) filter technique.

BACKGROUND ART

In recent years, the availability of high speed general purpose computing systems and digital video recorders has allowed for the advancement of techniques for detecting and finding scene content in video sequences.

The Fast Fourier Transform (FFT) is a well known and widely used technique for decomposing signals into periodic components and has been employed extensively in the realm of signal processing, to include cases when the signal consists of a single image pixel with time varying amplitude. However, in the case of imagery and video, where CCD arrays can include very large numbers of pixels (e.g., mega-pixels), the FFT method applied to each pixel vector becomes computationally expensive. A large memory buffer would be required in FFT applications to temporal video analysis or similar block processing approaches. Moreover, if the FFT were applied to temporal video analysis, using the full FFT for signals with known a priori periodic structure would result in a significant waste of computation time on irrelevant frequency components. Additionally, the FFT quantizes frequency bins, which could result in the misreporting of desired frequency content leading, in turn, to detection and/or classification errors.

In the communications, optics and signal processing communities, a large body of literature has been presented in general in relation to frequency detection modulation/demodulation [Daniel Zwillinger. *CRC Standard Mathematical Tables and Formulae, 31st Edition (Crc Standard Mathematical Tables and Formulae)*. Chapman & Hall/CRC, 2002; R. Beck, A. G. Dempster, and I. Kale. Finite-precision goertzel filters used for signal tone detection. *Circuits and Systems II: Analog and Digital Signal Processing, IEEE Transactions on*, 48(7):691-700, July 2001; G Goertzel. An algorithm for the evaluation of finite trigonometric series. *The American Mathematical Monthly.*, 1958; P Mock. Add DTMF Generation and Decoding to DSP-muP Designs, EDN, Mar. 21, 1985, *also DSP Applications with the TMS320 Family, Vol.* 1. Texas Instruments, 1989], the temporal aspects of video compression codecs [R. Westwater and B. Furht. Three-dimensional dct video compression technique based on adaptive quantizers. *Engineering of Complex Computer Systems*, 1996. *Proceedings., Second IEEE International Conference on*, pages 189-198, October 1996], and interferometry using single element detectors [D.-S. Ly-Gagnon, S. Tsukamoto, K. Katoh, and K. Kikuchi. Coherent detection of optical quadrature phase-shift keying signals with carrier phase estimation. *Lightwave Technology, Journal of* 24(1):12-21, January 2006; Wenwen Liang, Mingxin Qin, Mingke Jiao, HaoYang, Ke Li, Teng Jiao, Liyuan Bai, and Wenyong Wang. Phase detection based on the lock-in amplifier sr844 and experiments of brain neuron cells in mit system. *BioMedical Engineering and Informatics*, 2008. BMEI 2008. International Conference on, 1:638-642, May 2008; T. Maeno, M. Akiba, N. Hiromoto, and T. Takada. Two-dimensional lock-in amplifier systems for microscopic imaging. *Instrumentation and Measurement Technology Conference*, 1994. IMTC/94. Conference Proceedings. 10th Anniversary. Advanced Technologies in I & M, 1994 IEEE, pages 536-539 vol. 2, May 1994; M. Nakanishi and Y. Sakamoto. Analysis of first-order feedback loop with lock-in amplifier. *Circuits and Systems II: Analog and Digital Signal Processing, IEEE Transactions on*, 43(8):570-576, August 1996; W. D. Walker. Sub-microdegree phase measurement technique using lock-in amplifiers. *Frequency Control Symposium*, 2008 IEEE International, pages 825-828, May 2008; Wei Xu, D. L. Mathine, and J. K. Barton. Analog cmos design for optical coherence tomography signal detection and processing. *Biomedical Engineering, IEEE Transactions on*, 55(2):485-489, February 2008].

It would be useful to be able to provide scene content detection methods and systems that overcome one or more of the deficiencies of prior approaches to temporal video analysis. It would be useful to be able to perform temporal video analysis (e.g., with each data frame being processed efficiently, in real time, as it is captured) without the need for a large memory buffer as would be required by an FFT or similar block processing approach.

SUMMARY OF THE INVENTION

The methods and systems described herein facilitate detection of temporally oscillating sources in digital video signals. Such methods and systems can be implemented to provide temporal target detection, as well as target localization, tracking, tagging, identification (e.g., Friend or Foe, etc.), status indication, and low rate data transfer. Additional applications for the techniques described herein include, for example, object recognition, pixel classification, scene analysis, computer vision, robot vision, as well as any process involving a video reference from which it is desirous to extract one or more modulation frequencies from the video data.

In various example implementations, the techniques described herein provide methods and systems for detecting and locating temporally periodic oscillating sources in video signals, whose periodicity is known a priori. The scope of the present invention also includes temporal frequency detection for sources, whose periodicity is otherwise learned or determined, estimated or predicted, as well as sources for which temporal characteristics are variable.

Other methods and systems utilize information pertaining to the detection and location of a temporal oscillating target source to command and control a camera or other imaging system to track the target source.

The detection methods and systems can be implemented in hardware or software and effectively applied to either low or high frame rate video. Various example embodiments significantly reduce the computational complexity and computation time required over brute force and other prior approaches.

In an example embodiment, the detection technique is based upon the use and adaptation of Goertzel's Algorithm. More specifically, a differentiated version of Goertzel's Algorithm is used to process video frames. Example embodiments of methods and systems for detecting temporal oscillating sources involve the application of Goertzel's Algorithm to temporal frequency detection in video sequences. In example embodiments of the methods and systems as described herein, temporal oscillating sources are detected using a modified Goertzel IIR Filter.

In an example embodiment, a method for detecting a temporally oscillating source in digital video signals includes: using an imaging device to capture a sequence of input images of a scene; generating digital video signals from the sequence of input images; and processing the digital video signals using a recursive Infinite Impulse Response (IIR) filter technique based on a differentiated version of Goertzel's Algorithm to detect a temporally oscillating source in the digital video signals.

In an example embodiment, a system for detecting a temporally oscillating source in digital video signals includes: an imaging device configured to capture a sequence of input images of a scene and generate digital video signals; and a processor configured to process the digital video signals using a recursive Infinite Impulse Response (IIR) filter technique based on a differentiated version of Goertzel's Algorithm to detect a temporally oscillating source in the digital video signals.

In other embodiments, a user interface (such as a Graphical User Interface (GUI)) is configured to facilitate interactive aspects of methods and systems for detecting a temporally oscillating source in video signals and to generate graphical elements (e.g., pertaining to a detected temporally oscillating source, user input mechanisms, diagnostics, and/or other tools).

In an example embodiment, a method for detecting a temporally oscillating source in digital video signals includes: processing digital video signals using a recursive Infinite Impulse Response (IIR) filter technique based on a differentiated version of Goertzel's Algorithm to detect a temporally oscillating source in the digital video signals; and using a graphical user interface (GUI) to generate a visual display including one or more graphical elements at least one of which pertains to a detected temporally oscillating source.

In an example embodiment, a system for detecting a temporally oscillating source in digital video signals includes: a processor configured to process digital video signals using a recursive Infinite Impulse Response (IIR) filter technique based on a differentiated version of Goertzel's Algorithm to detect a temporally oscillating source in the digital video signals; and a graphical user interface (GUI) configured to generate one or more graphical elements at least one of which pertains to a detected temporally oscillating source.

BRIEF DESCRIPTION OF THE DRAWINGS

FIGS. 11A and 11B are plots of pixel SNR and detection certainty level, respectively, versus frame number, with the IIR Filter using a 30 frame integration time;

DISCLOSURE OF INVENTION

Figure 1:
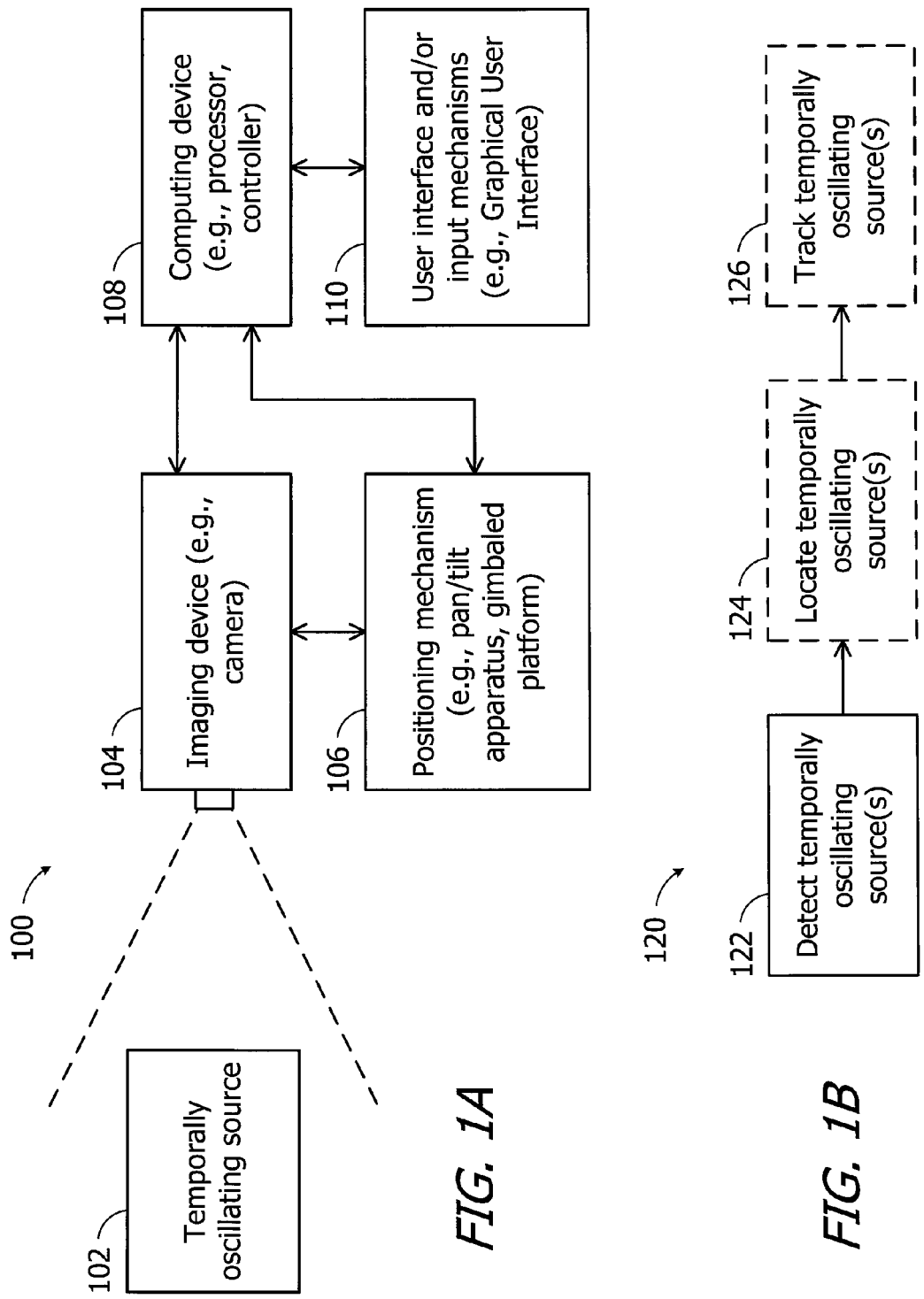
FIG. 1A illustrates an example system for detecting a temporally oscillating source in digital video signals.
FIG. 1B is a flow diagram of an example method for detecting a temporally oscillating source in digital video signals.

Referring to FIG. 1, in an example embodiment, a system 100 for detecting a temporally oscillating source 102 (e.g., an optical source) includes an imaging device 104 (e.g., a camera), a computing device 106 (e.g., processor, controller), a positioning mechanism 108 (e.g., pan/tilt apparatus, gimbaled platform), and a user interface and/or input mechanism 110 (e.g., Graphical User Interface (GUI)), configured as shown. Example embodiments of the system 100 described herein are capable of real time temporal processing performing the task of detecting and locating sources on full frame and/or high frame rate digital video signals. The temporally oscillating source 102 includes, by way of example, a single dominant frequency component that is known a priori. Although the description herein, for the sake of simplicity, is principally directed toward detection of such a source, the system 100 can also be configured to detect multiple temporally oscillating sources, as well as temporally oscillating sources that are not necessarily known a priori, or that vary, for example, in the way they are perceived or in some other characteristic.

The imaging device 104 can be a video camera, or other device capable of capturing sequences of images. By way of example, a Sony CCD camera (or other fairly standard, low cost camera equipped with auto/manual motorized focus, 72× zoom, auto gain, and various functions controllable via RS232 protocol) can be used. In an example embodiment, an analog video signal is used at the standard NTSC rate (29.97 frames per second) with an image size of 640×480 pixels. Multiple imaging devices can also be used, for example, in a system where the expected locations and/or orientations of temporally oscillating sources potentially prevent a single imaging device from capturing images of sufficient quality and/or quantity.

In this example embodiment, the imaging device 104 is mounted on or otherwise secured to the positioning mechanism 106. Under command of the computing device 108, the positioning mechanism 106 controls the direction that the imaging device 104 is pointed. By way of example, the imaging device 104 is mounted on a 3-axis gimbal (e.g., a gimbal commercially available from Cloud Cap Technology), which is controlled via RS232 protocol. In an example embodiment, the gimbal is equipped with a GPS unit and analog video output. The video output of the imaging device 104 can also be directed through the video output of the gimbal, which reduces the number of wires connecting a computer to the camera/gimbal system and eliminates the need to create additional slip ring assemblies in order to prevent wires from getting tangled during movement of the gimbal. In an example embodiment, a single RS232 (or other) port can be used to control both camera motion as well as camera functions, e.g., by providing commands pertaining to pan and tilt and platform stabilization, as well as pass-through commands to the camera. In an example embodiment, the computing device 108 (e.g., an IBM Thinkpad with dual 2.5 Ghz processors and 3 Gb RAM) includes a NTSC video capture card. The computing device 108 can also be implemented in firmware or hardware, or in various combinations of software, firmware and hardware.

In various example embodiments, the system 100 is configured to provide tracking functionality, under control of the computing device 106 and implemented, for example, by a feedback and tracking mechanism that utilizes a frame by frame detect and update control loop. In an example embodiment, the feedback and tracking mechanism is augmented by user interaction through a GUI or other user interface and/or input mechanism. In an example embodiment, one or both of the computing devices and GUI includes a data storage device. Additionally, or alternatively, one or both of the computing devices and GUI is configured to have access to a data storage device external to the system (e.g., remotely located, with a communication link provided between the system and the data storage device).

Referring to FIG. 1B, in an example embodiment, a method 120 for detecting a temporally oscillating source includes, at step 122, detecting one or more temporally oscillating sources. In some embodiments, detection of the source(s), in and of itself, may be the sole or principle function. Detection can be performed, for example, using a frame by frame sliding window or in a block update approach. In other embodiments, the method 120 also includes, at step 124, locating the temporally oscillating source(s). For example, a confidence scoring metric (e.g., a threshold) is used to find the most likely pixel location for a target point. In other embodiments, the method 120 further includes, at step 126, tracking the temporally oscillating source(s). For example, a camera feedback controller, if enabled, can use an estimated target location to reposition the camera and track the target source.

Figure 2:
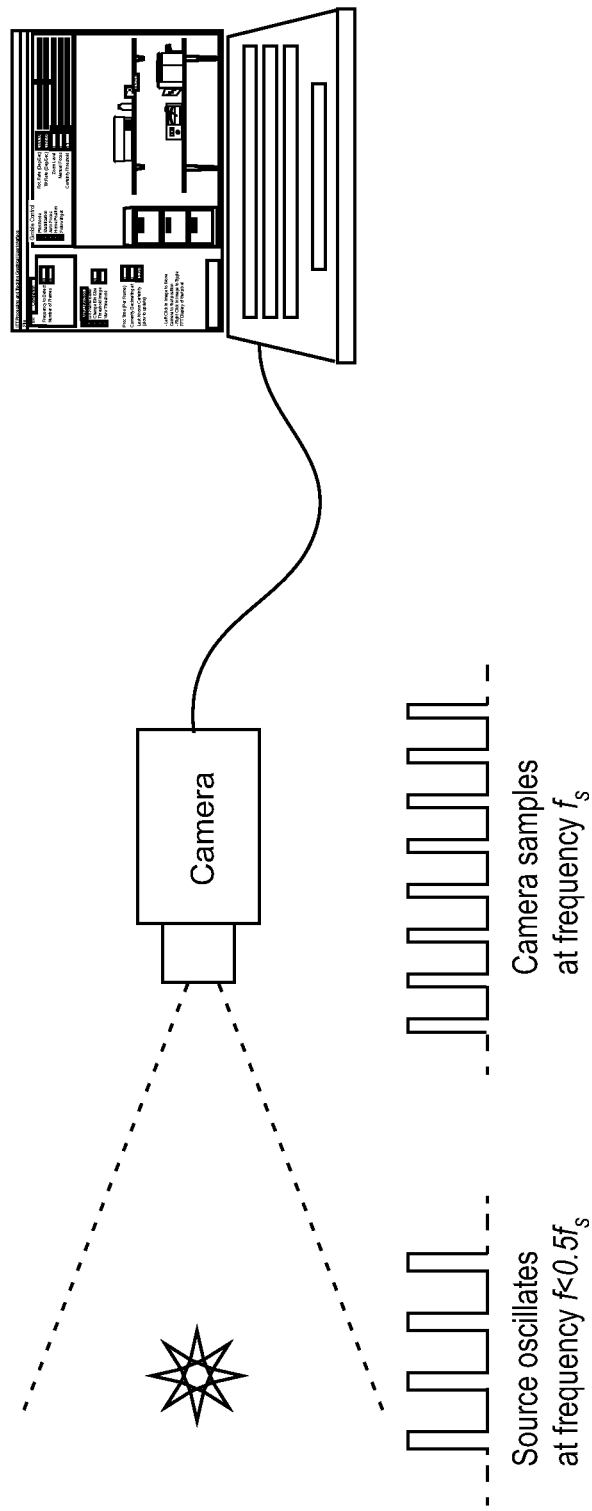
FIG. 2 illustrates an example system that utilizes an IIR Filter for single frequency detection.
Figure 3:
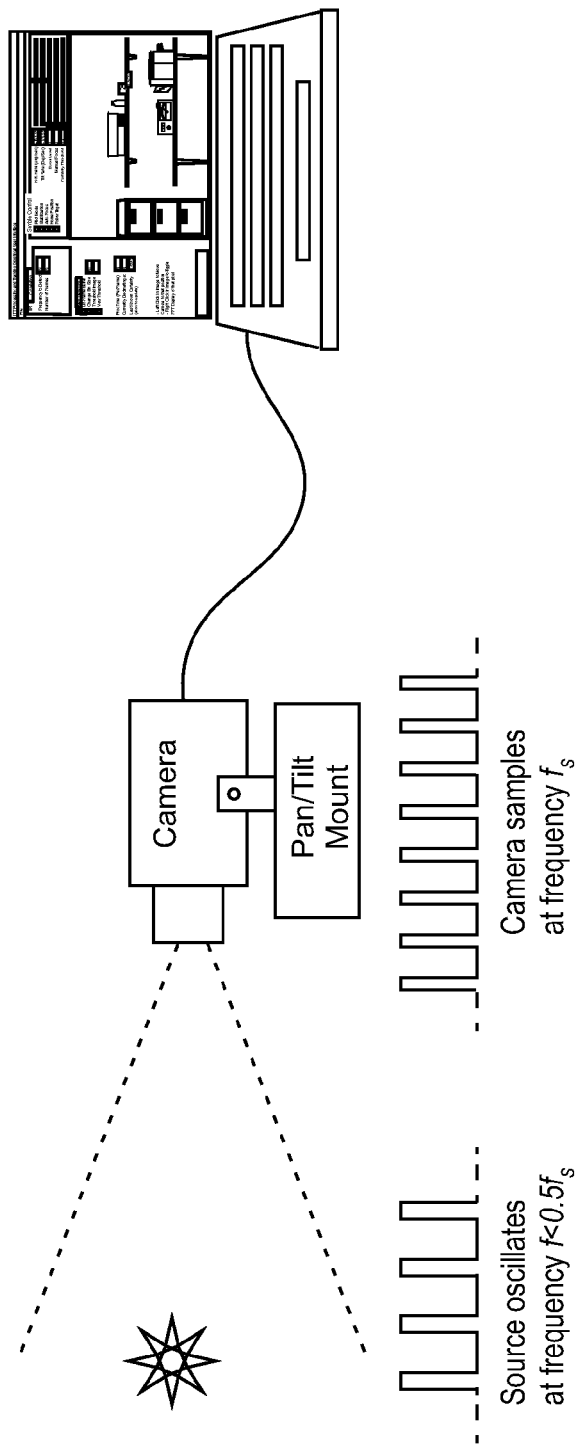
FIG. 3 illustrates an example system that utilizes an IIR Filter for single frequency detection with tracking functionality.

In example embodiments, the temporally oscillating source is detected using an Infinite Impulse Response (IIR) filter. For example, referring to FIG. 2, in an example system, a frequency, f, at which a light source oscillates, is detected using an IIR filter. The camera samples at sample frequency, $f_s$, selected such that $f<0.5f_s$. Referring to FIG. 3, in another example system, the camera is mounted on a motorized pan/tilt apparatus, which is controlled by a computer to position the camera so that the pixel detected stays centered in the display window.

Figure 4:
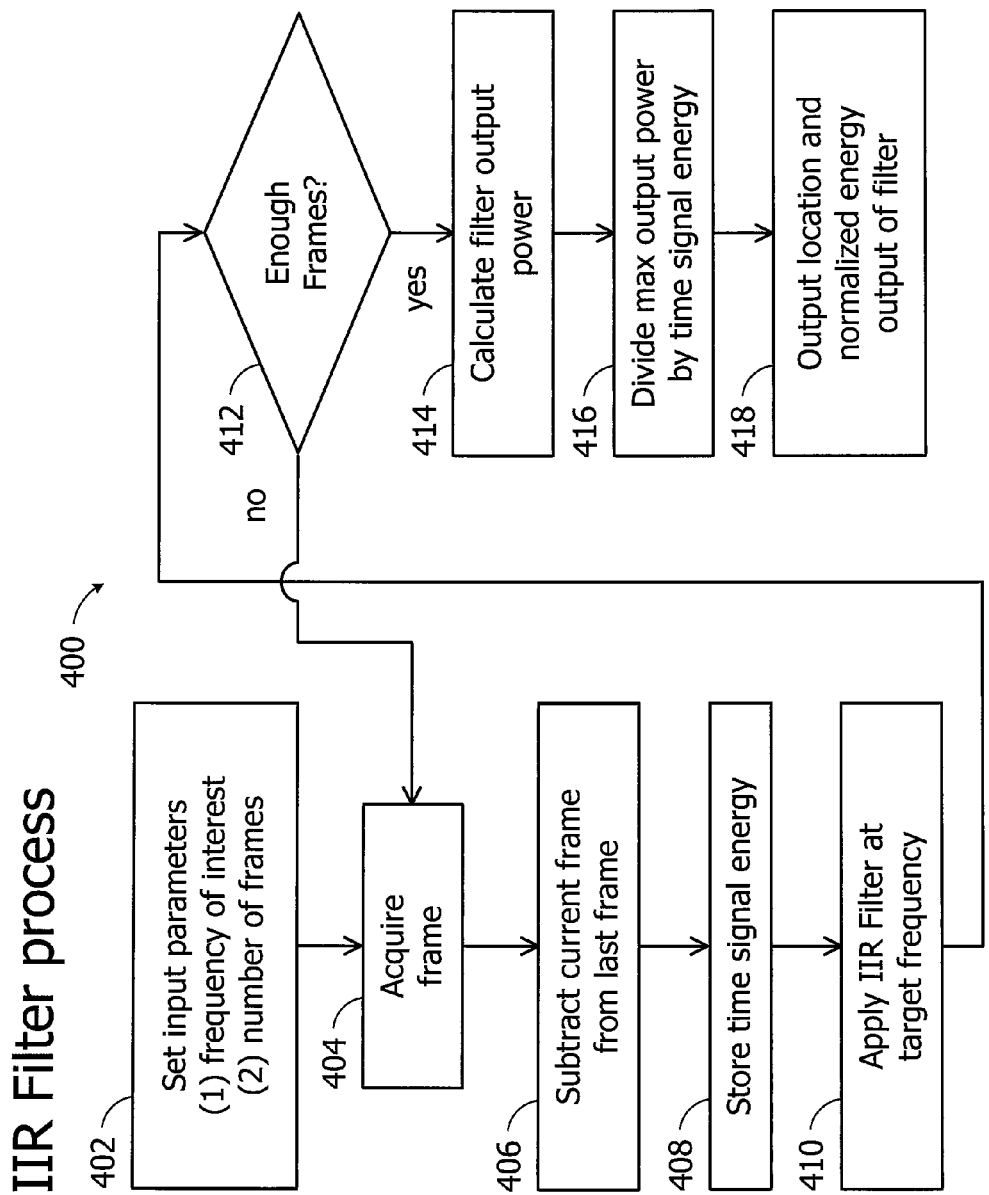
FIG. 4 is a flow diagram of an example Infinite Impulse Response (IIR) Filter process.

Referring to FIG. 4, in an example embodiment, an IIR Filter process 400 commences, at step 402, with the setting of input parameters: frequency of interest ("target frequency") and number of frames to be processed by the filter. At step 404, a frame is acquired, after which, at step 406, the current frame is subtracted from the last (previously acquired) frame. At step 408, the time signal energy is stored. At step 410, the IIR Filter is applied at the target frequency. (An example embodiment of the IIR Filter is discussed below in greater detail with reference to FIG. 6.) In an example embodiment, each frame and pixel is processed. At step 412, a determination is made as to whether a sufficient number of video frames have been acquired. If "no", the IIR Filter process 400 returns to step 404 in order to acquire another frame. If "yes", the IIR Filter process 400 advances to step 414 at which filter output power is calculated. At step 418, source location and normalized energy output of the IIR Filter are generated. The filter output (e.g., output level between 0 and 1) is normalized to the energy of the time-domain signal and provides a physically based confidence factor.

Figure 5:
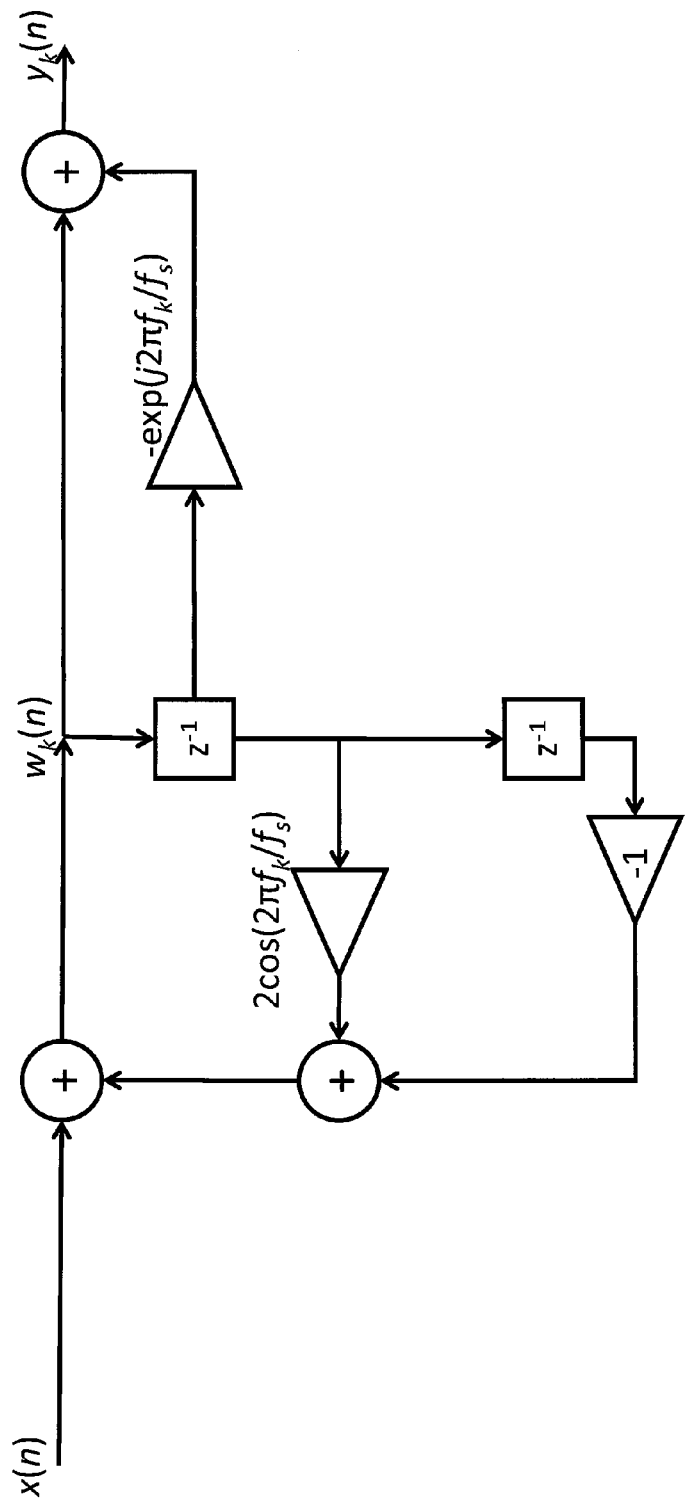
FIG. 5 illustrates a conventional second-order recursive Goertzel Filter.

Referring to FIG. 5, the Goertzel Algorithm is commonly implemented as a second-order recursive IIR filter. See, G Goertzel. An algorithm for the evaluation of finite trigonometric series. *The American Mathematical Monthly.*, 1958 and M. M. Kuo and Bob H. Lee. *Real-Time Digital Signal Processing: Implementations, Applications, and Experiments with the Tms320c55x*. John Wiley & Sons, Inc., New York, N.Y., USA, 2001, both of which are incorporated herein by reference.

In an example embodiment, Goertzel's Algorithm (an efficient implementation of a recursive IIR band pass filter with a very high Q) can be used for frequency detection in video signals. Goertzel's Algorithm, $$w_k^{xy}(n) = p_n^{xy} + 2\cos\left(2\pi\frac{f_k}{f_s}\right)w_k^{xy}(n-1) - w_k^{xy}(n-2),$$

in an IIR recursive filter implementation, $$|P(k)|^2 = [w_k^{xy}(N-1)]^2 - 2\cos\left(2\pi\frac{f}{f_s}\right)w_k^{xy}(N-1)w_k^{xy}(N-2) + [w_k^{xy}(N-2)]^2,$$

computes the squared magnitude at a specific frequency.

The algorithm acts as a boosting filter with a bandwidth determined by the number of frames used during the recursive calculation portion. After each set of N frames is processed the $w_k^{xy}(0)$ and $w_k^{xy}(1)$ initial conditions are reset to zero. As is, Goertzel's Algorithm will serve to enhance the temporal characteristics of every pixel vector in the input video data, but will not necessarily aid in localization due to the fact that some image pixels may have negligible frequency components, yet still have a high intensity value (i.e., a DC offset).

Figure 6:
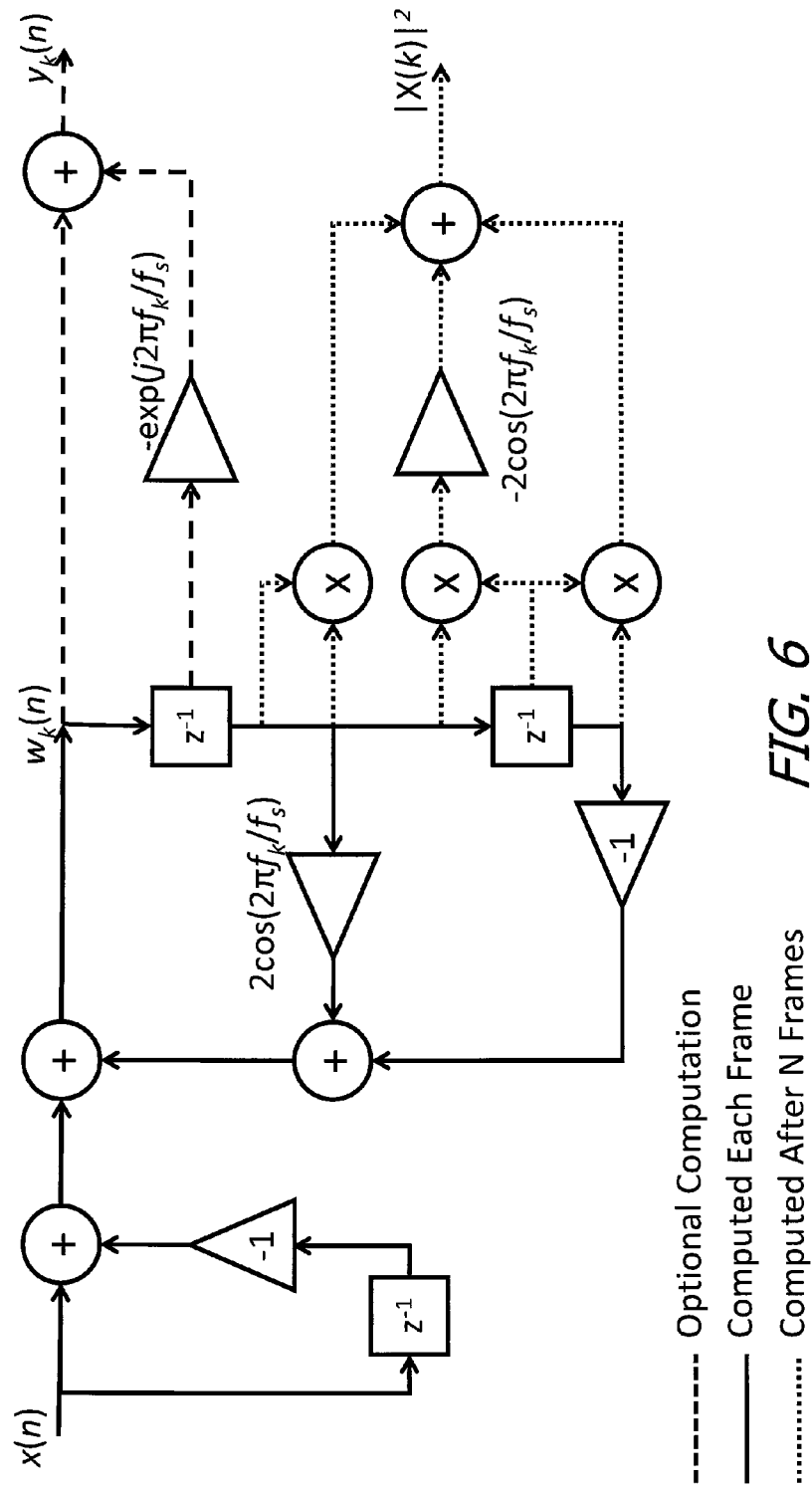
FIG. 6 illustrates an example embodiment of a modified Goertzel Filter according to the present invention.

Referring to FIG. 6, an example embodiment of a modified Goertzel Filter is now described. In order to convert the magnitude squared function into a detection score for the frequency of interest, the input to the Goertzel Filter is differentiated (frame difference). Because the derivative of a sinusoid is still a sinusoid at the same frequency, this input differentiation effectively removes low frequency (DC) pixels from consideration.

The resulting Z-Transform of the recursive portion of the modified Goertzel Filter (also referred to herein as a "Differential Input Goertzel IIR Filter" or "DIG IIR Filter") can thus be written as a differentiated version of Goertzel's Algorithm defined by the equation:

$$W(z) = \frac{1 - z^{-1}}{1 - 2\cos\left(2\pi\frac{f}{f_s}\right)z^{-1} + z^{-2}},$$

where f is the frequency of interest, $f_s$ is the sampling frequency and z is the independent variable of the discrete Laplace Transform, and in which the $z^{-1}$ term has been added in the numerator to the standard Goertzel Algorithm.

Figure 7A:
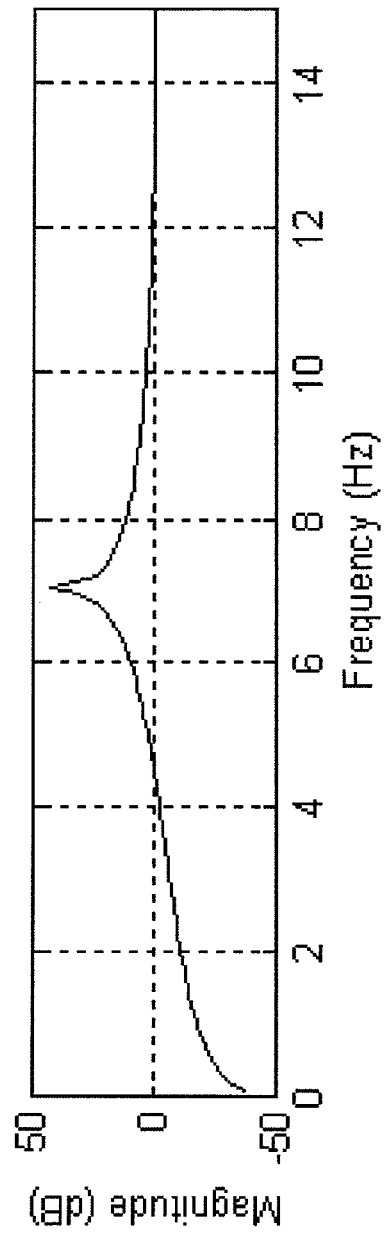
FIGS. 7A and 7B are plots of magnitude and phase response, respectively, of an example Differentiated Input Goertzel IIR Filter.
Figure 7B:
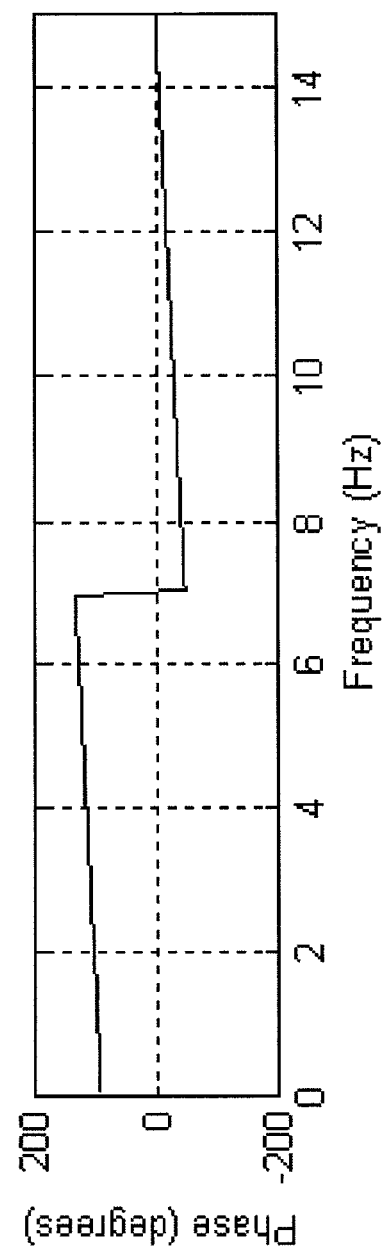

FIGS. 7A and 7B are plots of magnitude and phase response, respectively, of an example Differentiated Input Goertzel IIR Filter.

In this example Differential Input Goertzel IIR Filter, which operates on a per frame basis, multiplicative terms can be pre-computed, and there are 2 subtractions, 1 multiplication, and 1 addition per pixel per frame. The power estimate can be computed once after N frames processed, or continuously using a sliding window and running sums.

By applying Parsevals theorem, which states that the total energy content in the time domain is equal to the energy content in the frequency domain, an estimate can be made as to the ratio of the signal energy content at a desired frequency ($e_f$) to the total energy of the signal ($e_{tot}$). Optionally, the result can also be normalized by the number of frames used to integrate the result.

$$e_{tot} = \sum_{n=1}^{N} |x(n)|^2 = \sum_{k=1}^{K} |X(k)|^2$$

$$e_f = |X(f)|^2$$

$$conf = \frac{e_f}{e_{tot}} \text{ or } \frac{e_f}{Ne_{tot}}$$

Because the Goertzel Algorithm operates on a recursive filter design, the ratio for each pixel vector in each image frame can be calculated using a sample and update approach. In an example implementation, each image frame is sampled and the filter weights are updated accordingly. The power estimates can be updated by the use of running sums, which can be implemented efficiently in a O(PN) process for each data block. In an example embodiment, after every N frames, the power ratio estimates are read and a thresholding operation is used to determine the location of the signal source(s).

Thus, in an example embodiment, a confidence scoring metric is used to find the most likely pixel location for a target point, namely, a threshold based on the ratio of the desired frequency energy to the total energy of the input pixel vector. In other example embodiments, this threshold can be set by the user interactively (e.g., via a GUI or other user input mechanism).

In an example embodiment, the Differential Input Goertzel IIR Filter calculates a single-frequency Fourier transform of all the pixels in the image. The DIG IIR Filter requires the current frame and the previous frame as inputs, which are differenced before the processing starts. Processing occurs each time a frame is captured until the specified number of frames is reached. The final output of the filter is a pixel location along with a certainty level between 0 and 1 indicating how sure the filter is that the source identified is the correct source. The value of this certainty level is determined by the ratio of the power of the detected signal in the frequency domain to that of the power of the detected signal in the time domain.

In example embodiments of the methods and systems described herein, one or more processing approaches to detecting oscillating sources can be utilized. For example, a correlation process can be used.

Figure 8:
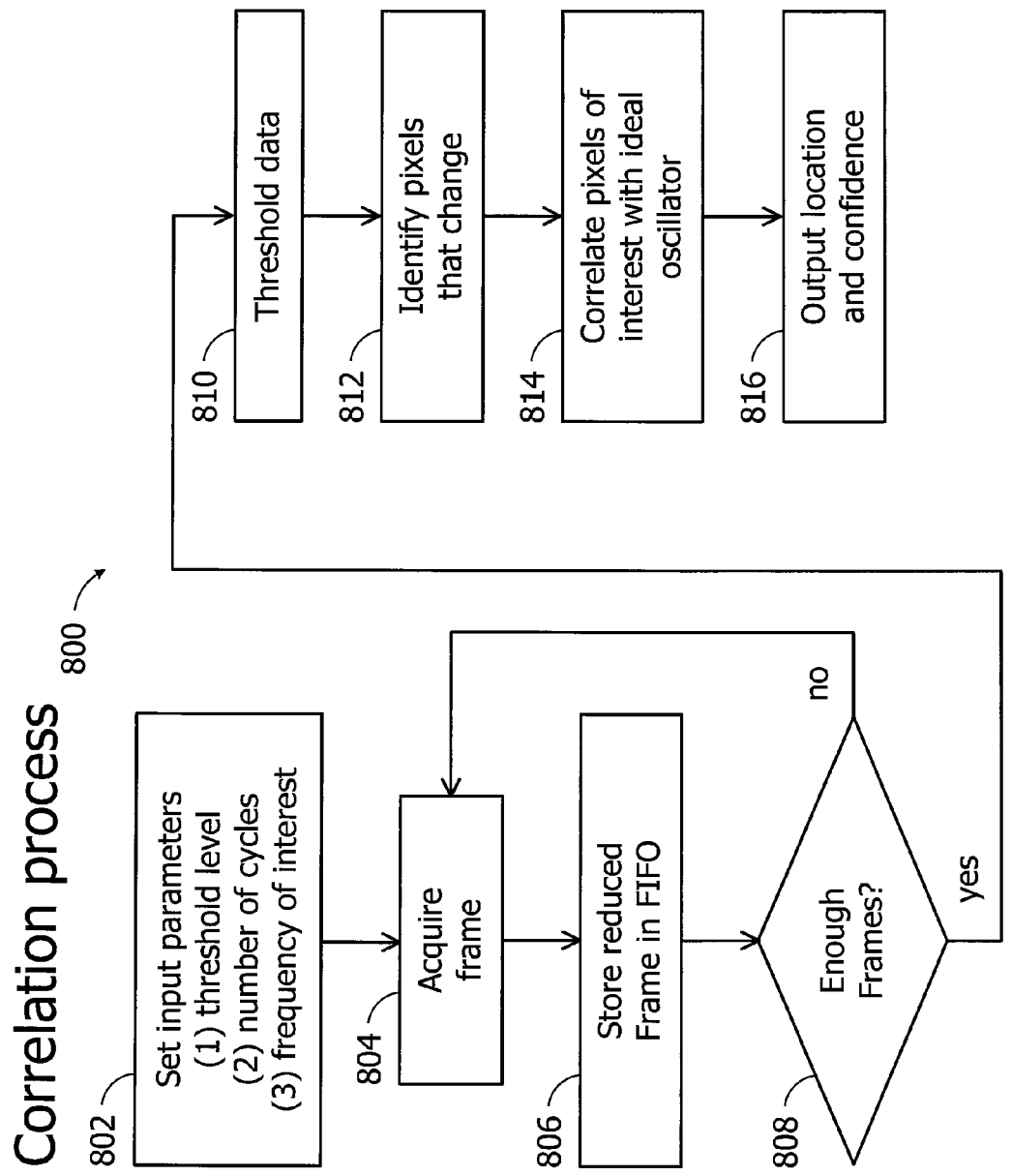
FIG. 8 is a flow diagram of an example correlation process.

Referring to FIG. 8, in an example embodiment, a correlation process 800 commences, at step 802, with the setting of input parameters: threshold level, number of cycles (i.e., the number of periods of the oscillating signal to search for), and frequency of interest. At step 804, a frame is acquired, after which, at step 806, the (reduced) frame is stored in memory (e.g., FIFO). At step 808, a determination is made as to whether a sufficient number of video frames have been acquired corresponding to the designated number of cycles. If "no", the correlation process 800 returns to step 804 in order to acquire another frame. If "yes", the correlation process 800 advances to steps 810, 812, and 814 at which, respectively, the threshold level is applied, pixels that change are identified, and pixels of interest are correlated with an ideal oscillator. At step 816, source location and confidence are output.

With respect to input parameters, the correlation filter also requires a frequency to search for, but instead of the number of frames, it requires the number of periods of the oscillating signal to search for. Additionally, it also requires a "rejection level" value between 0 and 1, which is used to apply a threshold to the difference image created before processing begins for this algorithm.

In an example correlation-based approach, the oscillation of the pixel value is compared to the expected oscillation of a source at the frequency of interest. Processing does not occur until the required number of frames is input into the filter. Once the necessary number of frames is acquired, each sequential frame is differenced and all of the difference frames are summed. The resulting difference image is used to determine if pixels are flashing or not. In an example embodiment, pixels that do not appear to be flashing are ignored, thus providing a "reduced frame", and processing then begins on all pixels that have not been ignored. Each pixel vector is then correlated to an ideal oscillator at the frequency of interest. The highest correlation value of all the pixel vectors analyzed is taken to indicate the target of interest. To generate a certainty value between 0 and 1, this maximum correlation value is divided by the auto correlation of the ideal oscillator (i.e., the maximum correlation that can be obtained).

It should be appreciated that other approaches to oscillating source detection can be implemented such as, for example, FFT Frequency Detection and/or Phase Invariant Frequency Detection. Moreover, such approaches can be implemented alone or in conjunction with the IIR Filter processing approach described herein.

In example embodiments of methods and systems detecting a temporally oscillating source, sensitivity and target motion are taken into consideration. The sensitivity of a detection system or method is influenced by the bandwidth of the filters used, which in turn is determined by the Nyquist sampling theorem and the number of frames used for processing the result. Furthermore, the sensitivity of the algorithms is inversely related to robustness of each algorithm in respect to target motion and platform jitter.

The processing approaches described herein can be used to track a moving target source provided the target source fills more than one pixel element (on the focal plane array) and the motion of the target source in the image frame remains quasi-static with relation to the number of frames used for calculating a detection score. At least one pixel element must receive energy from the target source for the duration of the update period. However, in order to increase the sensitivity of any of these algorithms to a low SNR source, a longer sequence of input data must be examined. Provided that the sample rate stays constant this translates to a longer period of time required to observe a target scene. As moving sources traverse the image plane, they will be detected by multiple focal plane array elements. This energy smearing can reduce the effective SNR from the target source and result in higher probabilities of detection failure, particularly with small targets.

Although the DIG IIR Filter is computationally efficient, there are computational challenges in processing mega-pixel video sequences. By way of example, for a camera running at standard NTSC frame rate (29.97 Hz) with an image size of 640×480 pixels, the processing time of the filter needs to be less than the time between successive frame captures (~33.37 milliseconds). If the processing time takes longer than the 33.37 millisecond limit, the frames will not be captured at a consistent rate from the NTSC video capture card, disrupting the sampling rate of the image acquisition and corrupting the signal sought to be detected with aliasing artifacts and sampling errors.

Figure 9A:
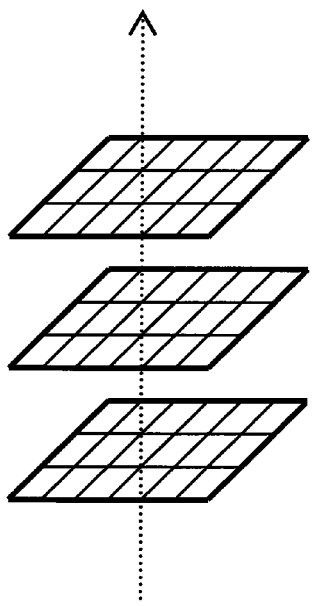
FIG. 9A illustrates an example of changing pixel values frame to frame.
Figure 9B:
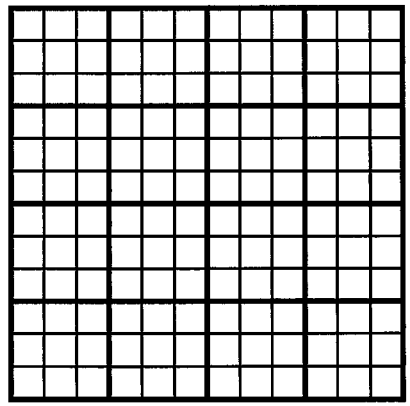
FIG. 9B illustrates an example neighborhood binning technique that utilizes a 3×3 square.

One approach to mitigating these effects is to use a pixel binning technique, e.g., when higher numbers of frames are being processed. FIG. 9A illustrates an example of changing pixel values frame to frame. FIG. 9B illustrates an example neighborhood binning technique that utilizes a 3×3 square. By binning the image, the detection algorithm is effectively tricked into treating the moving source as if it is staying within a single pixel vector, which increases the detection performance by allowing the processing algorithm a longer number of time bins to process over.

In an example embodiment, a neighborhood binning technique is employed that sums all of the pixel vector data over an N×N grid, producing a set of super-pixel vectors and reducing the image size by $N^2$. From a processing speed standpoint, in some system implementations, a 2×2 grid is sufficient for maintaining the filter processing time below the required 33.37 milliseconds. While binning may reduce image quality and cause a slight decrease in overall scene SNR, it improves both processing time and tracking performance when attempting to detect a moving source.

Figure 10A:
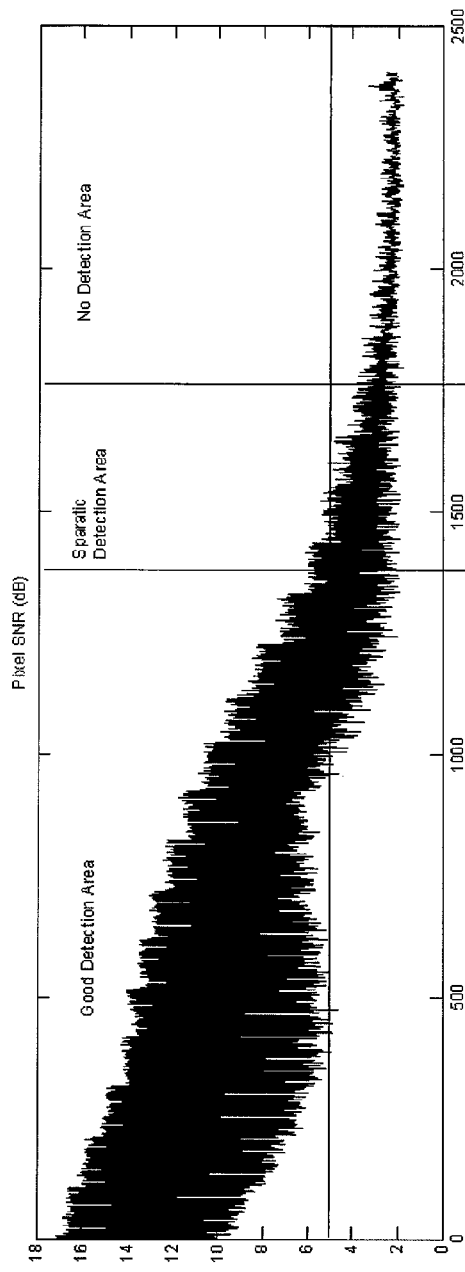
FIGS. 10A and 10B are plots of pixel SNR and detection certainty level, respectively, versus frame number, with the IIR Filter using a 15 frame integration time.
Figure 10B:
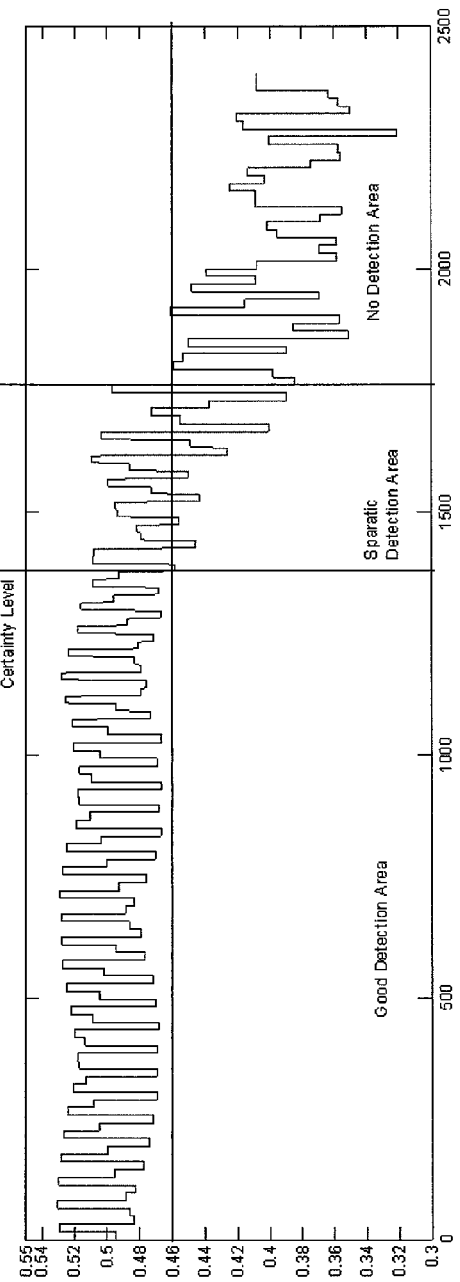

In order to determine under what lighting and scene conditions a particular filter is capable of effectively operating, a test can be performed wherein the algorithm is executed and pixel signal-to-noise ratio (SNR) and certainty level measurements are taken while the brightness of the source is ramped down. By recording the confidence metric at each step and noting the point at which the system could not detect a signal, SNR performance requirements can be determined. Moreover, such a test can be performed for a given filter that is run using different frame integration times. For example, FIGS. 10A and 10B show plots of pixel SNR and detection certainty level, respectively, versus frame number, with the IIR Filter using a 15 frame integration time. In FIG. 10B, the horizontal line indicates the level where the filter stopped making good detections and the left vertical line indicates where this horizontal line crosses the detection score plot. When the IIR Filter uses a 30 frame integration time, as FIGS. 11A and 11B show, the certainty levels are much more stable that with 15 frames, and the minimum SNR required for a good detection using 15 frames is roughly double that required for 30 frames.

In other embodiments, a user interface (such as a Graphical User Interface (GUI)) is configured to facilitate interactive aspects of methods and systems for detecting a temporally oscillating source in video signals and to generate graphical elements (e.g., pertaining to a detected temporally oscillating source, user input mechanisms, diagnostics, and/or other tools).

Figure 12:
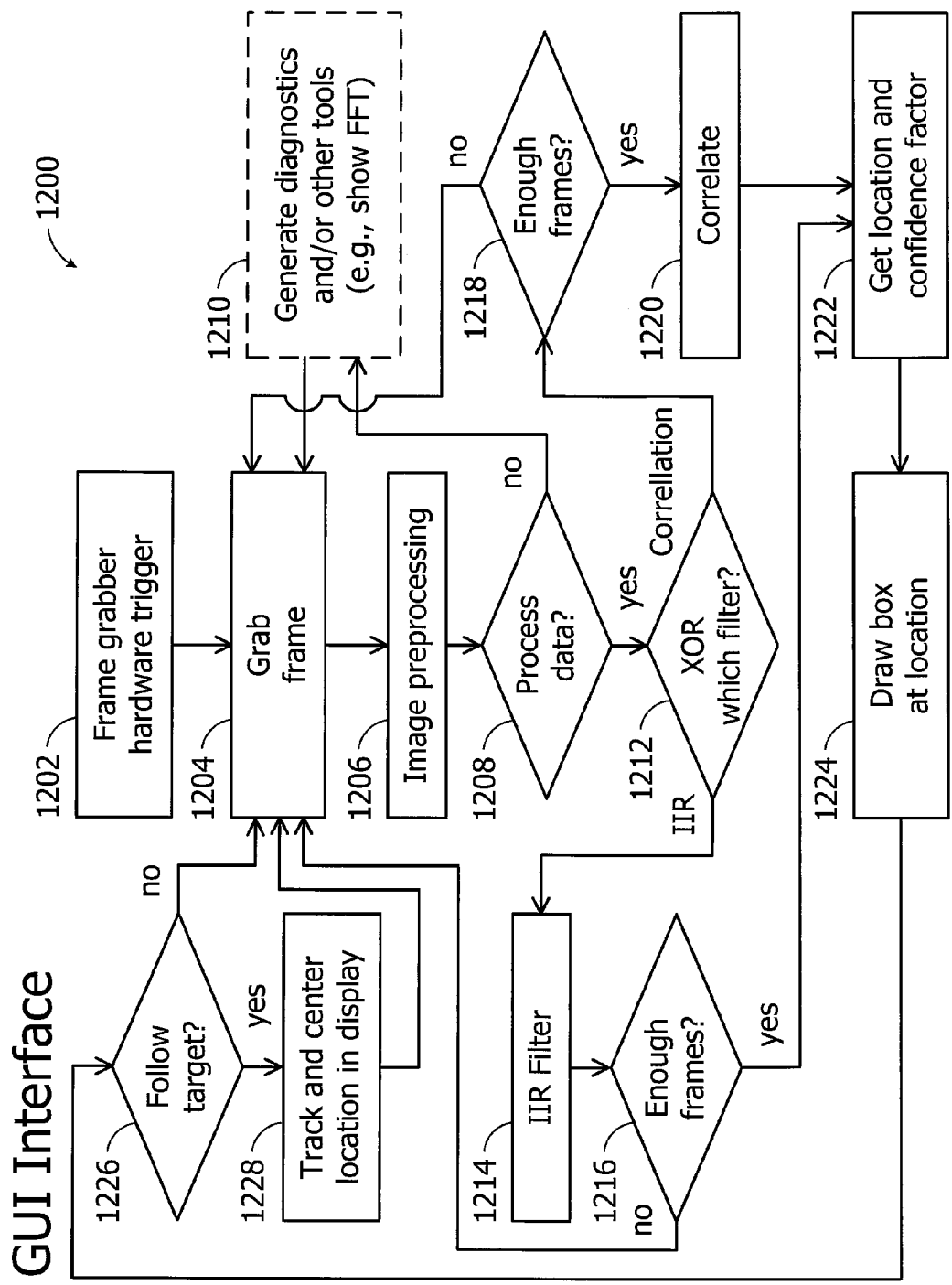
FIG. 12 is a flow diagram showing the overall functionality of an example Graphical User Interface (GUI)

Referring to FIG. 12, a flow diagram 1200 shows the overall functionality of an example Graphical User Interface (GUI), which operatively interfaces with the computing device 108 (FIG. 1A) as described below. At steps 1202 and 1204, respectively, frame grabber hardware (e.g., a VCE-PRO PCMCIA Cardbus video capture card, available from Imperx Incorporated) is triggered and a frame is grabbed. At step 1206, image preprocessing (if any) is performed. At step 1208, a determination is made as to whether to proceed with processing the data. For example, a user input provided via the GUI, a default setting, an override command, or an output generated by the computing device can be used to make this determination. If a determination is made not to process the video data, the interface processing advances to step 1210 (optional) at which the GUI is controlled to generate diagnostics and/or other tools and then back to step 1204 to grab the next frame.

If a determination is made to process the video data, the interface processing advances to step 1212 at which a determination is made whether to apply an IIR Filter or a correlation process. For example, a user input provided via the GUI, a default setting, an override command, or an output generated by the computing device can be used to make this determination. In an example embodiment, the GUI is configured and controlled to facilitate transition between the filters. In an example embodiment, the transition between filters is transparent to the user.

In an alternative embodiment, the GUI is controlled to present a single type of filter process (e.g., only an IIR Filter is implemented). In another alternative embodiment, the GUI is controlled to present three or more filter processes. In another alternative embodiment, the IIR Filter is "paired" with a different type of filter than the correlation process. In another alternative embodiment, multiple versions of the same type of filter (e.g., multiple IIR Filters, for example, with varying input parameters) are made available to be applied to the video data. In another alternative embodiment, multiple instances of one or more filters are made available to be applied to the video data, with the instances being executed either sequentially or in parallel.

Referring again to FIG. 12, when the interface processing advances to step 1214, IIR Filter processing is implemented as previously described. At step 1216, the determination is made as to whether there are sufficient frames for IIR Filter processing. For example, a user input provided via the GUI, a default setting, an override command, or an output generated by the computing device can be used to make this determination. When the interface processing advances to step 1218, the determination is made as to whether there are sufficient frames to advance, to step 1220, to proceed with correlation processing. For example, a user input provided via the GUI, a default setting, an override command, or an output generated by the computing device can be used to make this determination. When either processing step is completed, the interface processing next advances to step 1222 at which the location and confidence factor information are accessed and used, at step 1224, to generate one or more graphical elements pertaining to a detected temporally oscillating source (e.g., draw a box at the location of the source).

At step 1226, a determination is made as to whether the detected target is to be followed. If a determination is made in the affirmative, the interface processing advances to step 1228 and the detected target is tracked and centered on the display as previously discussed. If the detected target is not to be followed, the interface processing returns to step 1204 to grab the next frame.

Figure 13:
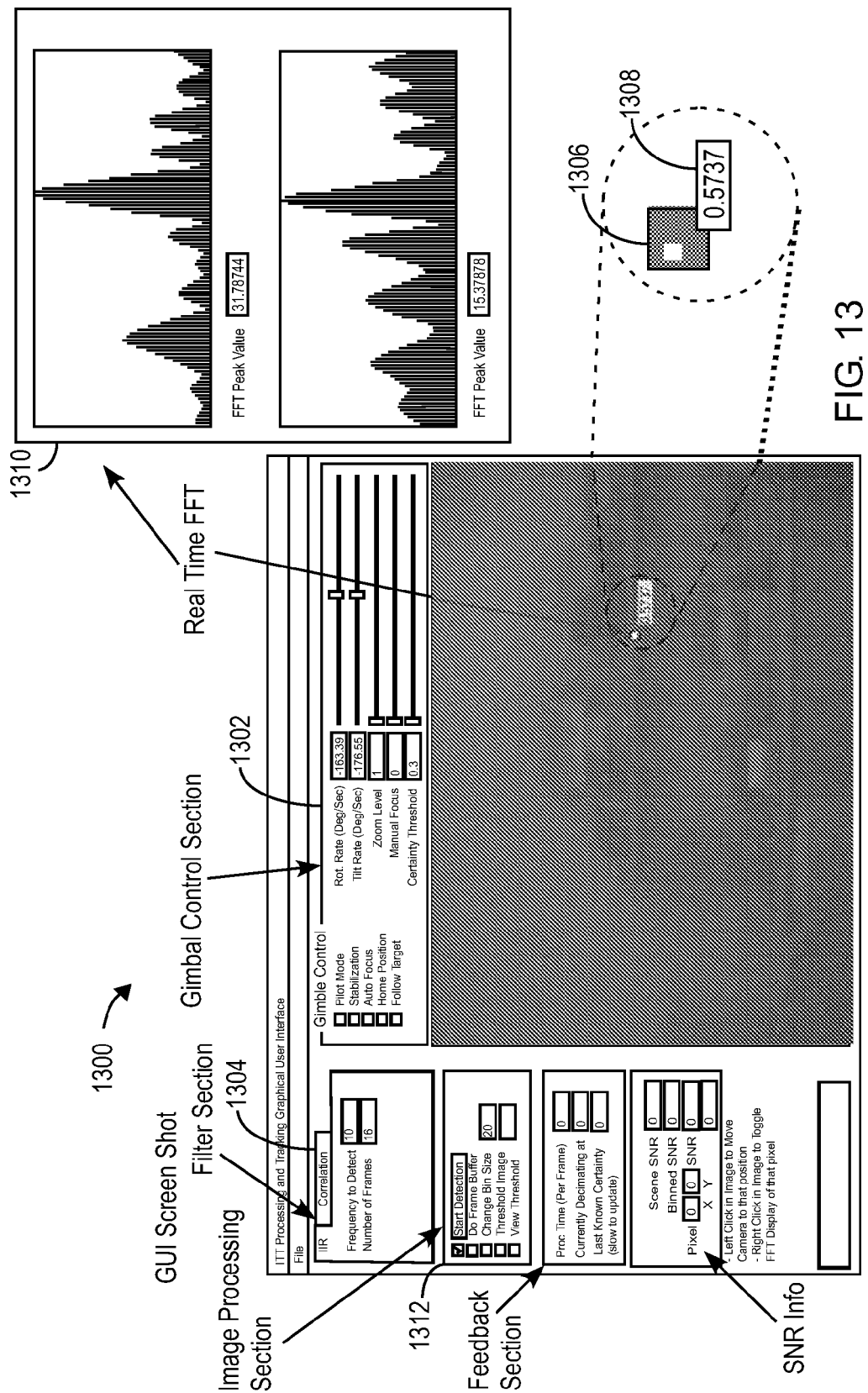
FIG. 13 is a screenshot of an example GUI configured to generate user input mechanisms, diagnostics and other tools.

Referring to FIG. 13, an example GUI 1300 is configured as shown to generate user input mechanisms, diagnostics, and other tools. In this example embodiment, the GUI 1300 includes a Gimbal Control Section 1302, which is configured and controlled to allow a user to provide inputs pertaining to camera and gimbal control. In an example embodiment, a camera interface is provided that allows images returned from the camera to be displayed, and additionally facilitates user control of camera functions such as zoom and focus.

In this example embodiment, the Gimbal Control Section 1302 is provided with user inputs in the form of two slider controls, denoted Rot. Rate and Tilt Rate (for controlling movement of the gimbal, and three additional slider controls for adjusting Zoom Level, Manual Focus, and Certainty Threshold, respectively. These graphically implemented user input mechanisms allow a user to easily control each of these functions. Positions are fed back to the user via a text box next to the slider for each function. In an example embodiment, the rate of movement is made dependant on or controlled in response to the zoom level, i.e., when zoomed at a high level (30× or 40× zoom), the gimbal rotates more slowly than if it were not zoomed in at all.

A slider control makes it relatively easy to position the camera but can, at times, be cumbersome to use. Accordingly, in an example embodiment, the ability to control camera movement based on where the user clicks within the image can also be implemented. For example, a "left click" on the image display centers the camera on the selected pixel. This greatly improves the ability to quickly position the camera where desired.

In this example embodiment, the gimbal controls are implemented as check boxes and include the following functions: Pilot Mode, Stabilization, Auto Focus, Home Position, and Follow Target. Depending on how the gimbal is mounted, the camera could be upside down. Pilot Mode provides a way for the user to tell the camera which way is "up". Another useful command is Stabilization, which eliminates high frequency vibrations from the system to enhance image stability. The 'Auto Focus' command toggles the camera's automatic focus "on" or "off". When turned off, the focus slider can be used to manually adjust the focus of the camera. The Home Position function returns the camera to its zero-position and is useful when experimenting with various zoom levels and repositioning the camera manually. The Follow Target command initiates tracking functionality to the end of keeping the location of the detected source centered in the video image. All of the functions facilitated by the Gimbal Control Section 1302 can be controlled by a user or automatically by the GUI 1300.

Figure 14:
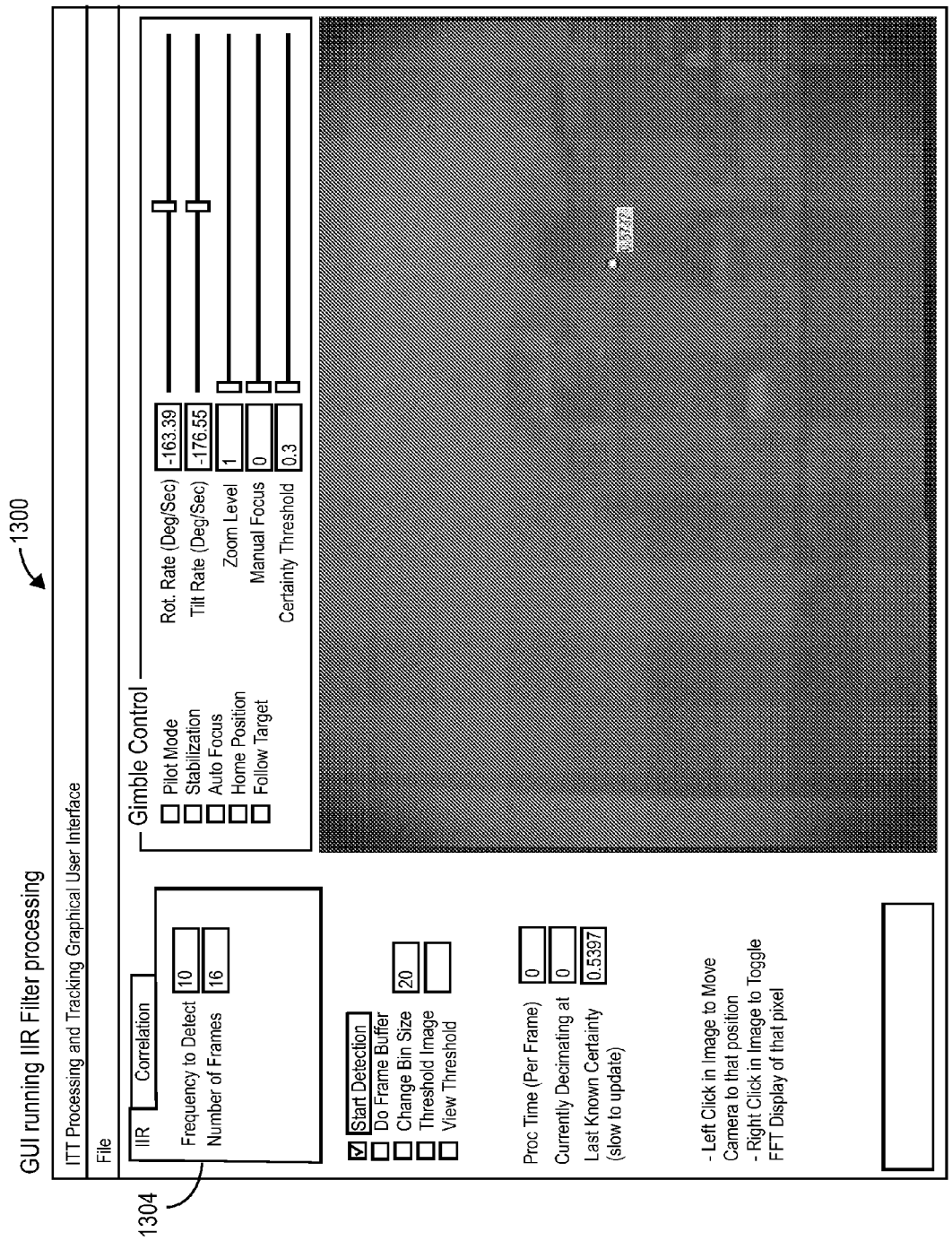
FIG. 14 is a screenshot of an example GUI generated during IIR Filter processing.
Figure 15:
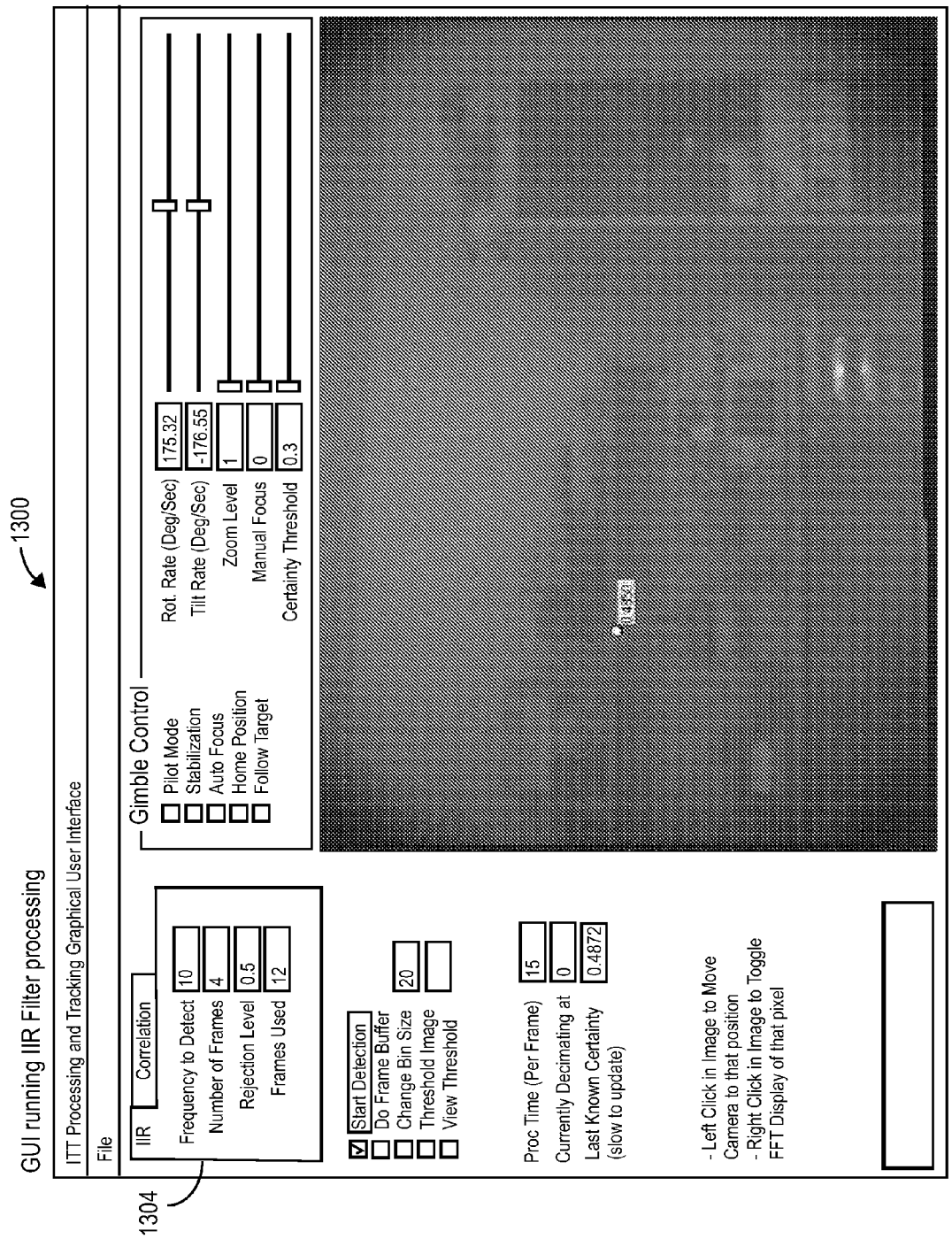
FIG. 15 is a screenshot of an example GUI generated during correlation processing.

In this example embodiment, the GUI 1300 includes a Filter Section 1304, which is configured and controlled to allow a user to provide inputs pertaining to selecting which filter to apply to the video data. In this example embodiment, to select an algorithm, the user needs only click on the appropriately labeled tab in Filter Section 1304 and set the desired frequency to search for. For both filters, there are default settings for their respective input parameters, which the GUI is configured to allow the user to adjust. Referring also to FIG. 14, when the IIR Filter has been selected, the input parameters include: Frequency to Detect and Number of Frames. Referring also to FIG. 15, when the Correlation filter has been selected, the input parameters include: Frequency to Detect, Number of Cycles, Rejection Level, and Frames Used.

Along with integrating user control of one or more filters into an interface, in this example embodiment, diagnostics and/or other tools are also provided. Referring again to FIG. 13, to enhance user visualization of the source detection and location processing, in this example embodiment, the GUI is configured and controlled to automatically generate a box (or other boundary) 1306 drawn around the pixel location returned by the algorithm along with a field 1308 in which a certainty value is generated, providing an indication of the degree of confidence in the detection. It should be understood that the GUI can be configured and controlled to generate other graphical elements as well.

Due to the inherent noise of any CCD camera, the certainty values will never reach zero. In an example embodiment, a threshold is set to only draw a box around a location if the algorithm returns a certainty greater than this threshold value. For example, the threshold is set using a slider bar "on the fly" to empirically determine what certainty value indicates there has been a good detection. This value is dependant on or varies with changes to the signal-to-noise ratio (SNR) of the system and that of the source. Moreover, this threshold value becomes increasingly important in attempting to detect a moving source. Ideally, the system detects the source and then centers the camera on the pixel that contains the source. However, moving the camera creates motion in the image, which can throw off the algorithms. In an example embodiment, during times when the detection certainty values are low, e.g., while the camera is moving, a mechanism is provided for controlling the camera not to move. This threshold value has proven essential to meet this end. Thus, in this example embodiment, the camera is controlled to only move if the certainty level is above the threshold value. If proper care is taken to set this threshold value while the source is stationary, the detection of a moving target is more readily achieved.

In an example embodiment, an image buffer is created that stores a number of images in memory. When the appropriate number of images is reached, the system pauses to save data to disk in a directory indicated by the user. Data saving is done in this fashion to ensure that the writing of the data to the hard disk or other data storage device does not slow down the image acquisition process. If this happens, the temporal data will be corrupted and the data will be compromised if not useless.

The integrity of the image acquisition process is important for the additional reason that it can be used to provide additional tools for helping the user to understand and identify what the system is actually detecting. For example, even though a signal was not placed in the scene and even though a perceived frequency thought to be separate from any naturally occurring frequency was selected, a signal (such as a low frequency signal resulting from equipment vibration) can still arise naturally within the scene.

In this example embodiment, the GUI 1300 is configured and controlled to additionally provide the user with additional diagnostics and other tools for visualization purposes, namely, real time FFT and SNR displays.

Figure 16:
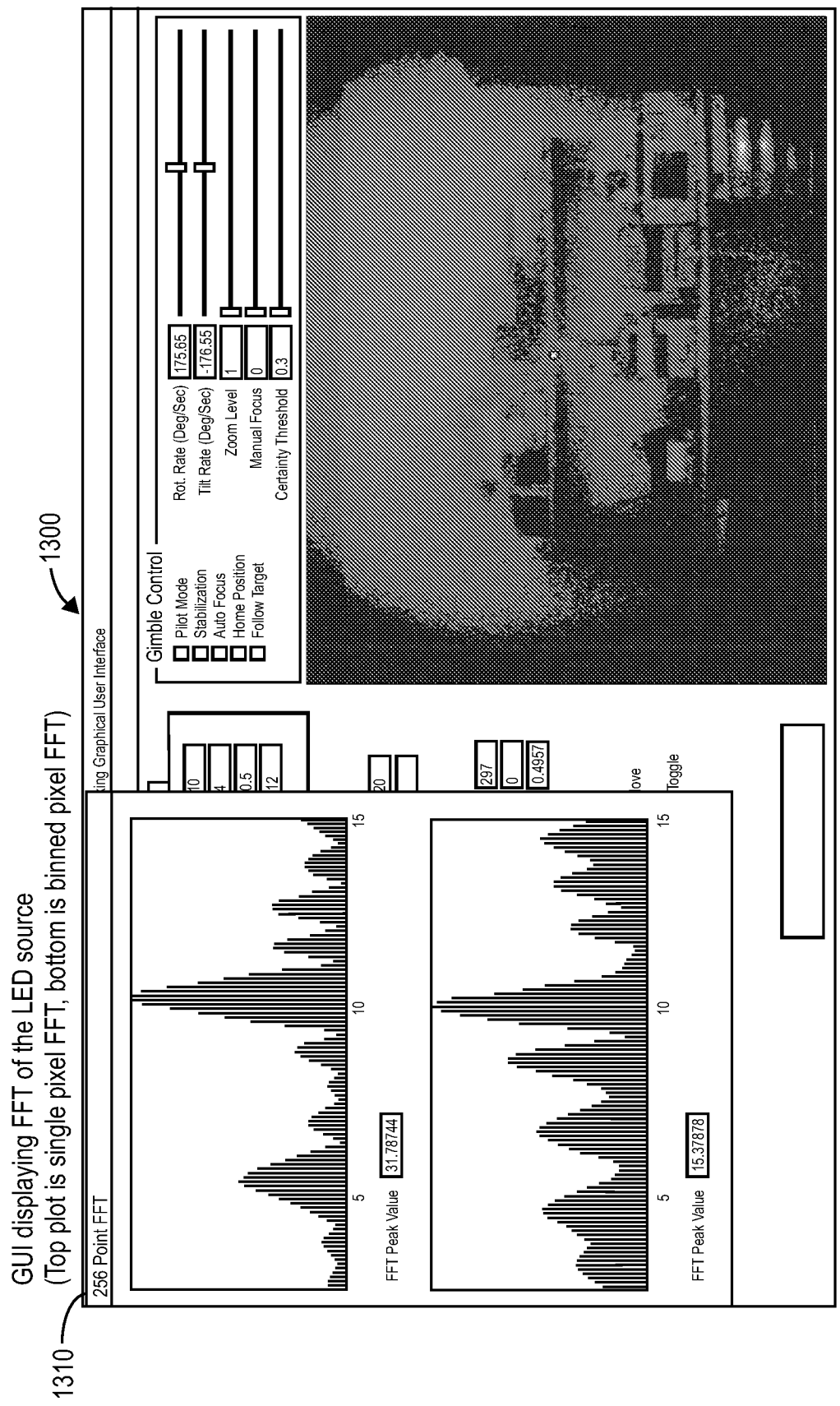
FIG. 16 is a screenshot of an example GUI that includes an additional window displaying single pixel FFT and binned pixel FFT of a source.

Referring also to FIG. 16, in an example embodiment, the GUI 1300 is configured and controlled to generate a window 1310 displaying the single pixel FFT and binned pixel FFT of a source. In an example embodiment, the FFT display is generated to show the frequency spectrum of the selected source or other object in the image. In an example embodiment, the window 1310 is generated, for example, by first having the user "right click" on a pixel in the image. For the next N frames, the value of this pixel is stored in a data buffer (the value of N is the number of frames being used to process the data). When the buffer is filled, a fast Fourier transform is performed on the data and a new window displays the resulting frequency spectrum of the pixel. This display updates every N frames, giving a real time display of the frequency of that pixel as well as the "binned" pixel. In an alternative embodiment, only one of the single pixel FFT and binned pixel FFT is included in the display. In another alternative embodiment, a single pixel FFT and multiple binned pixel FFTs are included in the display. Other tools can also be implemented to the end of providing a user with the ability to check the frequency or other characteristics of objects in a scene.

Referring again to FIG. 13, in this example embodiment, the GUI 1300 includes an Image Processing Section 1312, which is configured and controlled to allow a user to provide inputs pertaining to image processing functions. In this example embodiment, the user inputs include check boxes for selecting or activating the following functions: Start Detection, Do Frame Buffer, Change Bin Size, Threshold Image, and View Threshold.

Further with regard to pixel binning, in an example embodiment, the pixels are binned together using a square neighborhood summing technique that creates smaller images for the algorithms to work with. The neighboring pixels are summed (as opposed to averaged) to reduce the effect of the binning on the signal to noise ratio. The size of the square used for the binning can be set dynamically by the user and can also be presented as a graphic element on the image display (e.g., in the form of a dotted grid, in which the dots mark the corners of each square neighborhood of pixels).

Pixel binning also has a positive impact on the ability to detect moving targets. In order to make a successful detection, the source has to stay in one pixel for however many frames the algorithms are processing. For example, a particular algorithm may require a minimum of 15 frames in order for a good detection to be made. This means that in order to track a moving target, it must stay in one pixel for half of a second. Even a target half a kilometer away moving at 10 miles per hour does not meet this requirement. Depending on the size of the square used to bin the image, a source will stay within one binned pixel for a longer period of time. Pixel binning in effect tricks the algorithm into processing a moving target as if it were stationary (or moving less than it actually is).

In an example embodiment, the GUI 1300 is configured and controlled to generate SNR displays (such as previously discussed with referenced to FIGS. 10A and 11A). Referring again to FIG. 13, in this example embodiment, the GUI 1300 includes a SNR Info Section 1314, which is configured and controlled to allow a user to provide inputs pertaining to generating SNR displays. In an example embodiment, the GUI 1300 is configured and controlled to provide a SNR monitor tool that can be utilized by the user to set the certainty threshold at an appropriate value (as previously discussed with reference to FIGS. 10A, 10B, 11A, and 11B).

Figure 17:
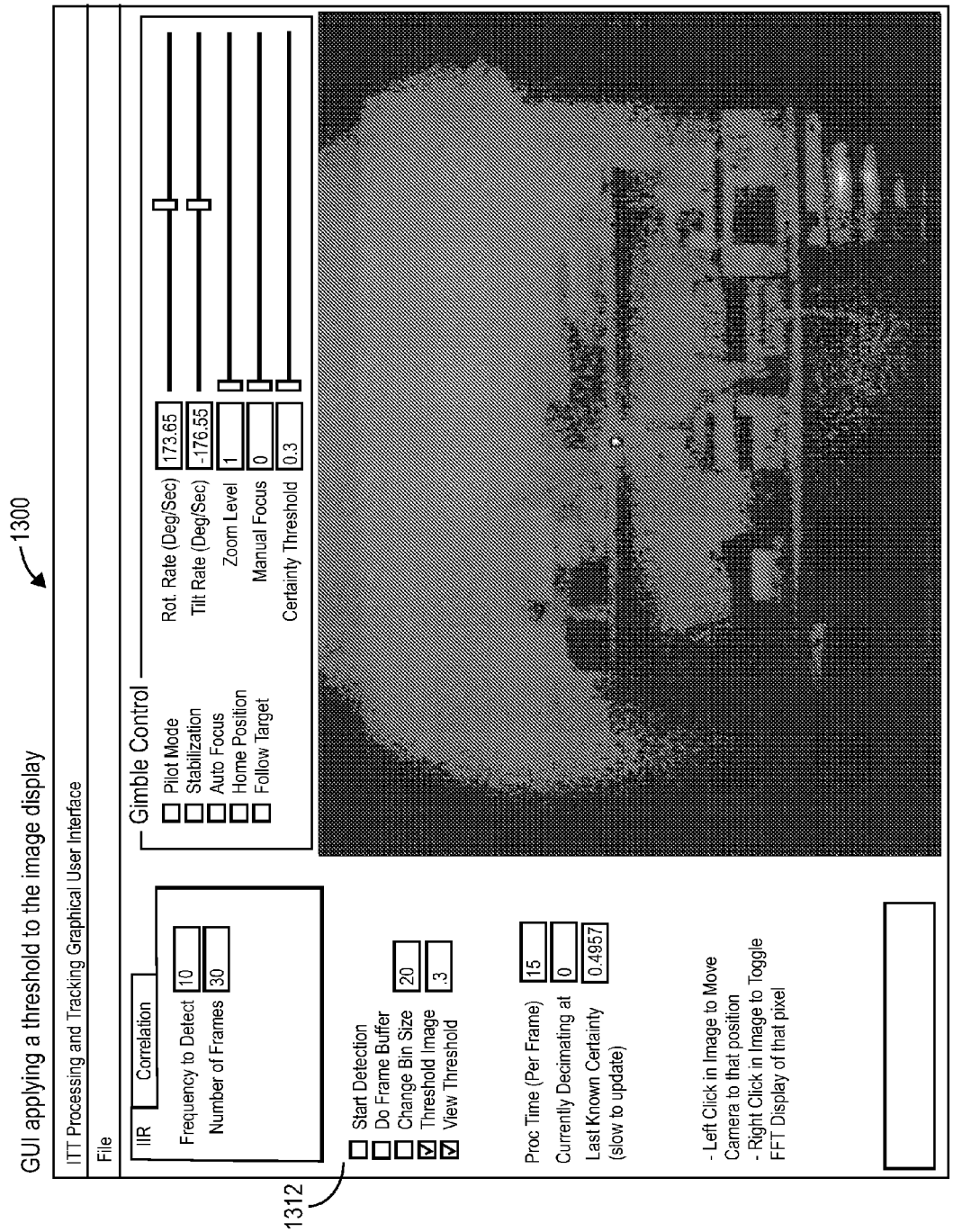
FIG. 17 is a screenshot of an example GUI generated during application of an imaging threshold.

Referring also to FIG. 17, in this example embodiment, the GUI 1300 is configured and controlled to allow a user, via the Image Processing Section 1312, to cause the GUI to execute an image threshold option to reduce noise. For example, this threshold sets all pixel values below a certain value to zero. By applying this threshold, the resulting increase in SNR, in some instances, improves the ability of algorithms to detect a source within the scene.

Although the present invention has been described in terms of the example embodiments above, numerous modifications and/or additions to the above-described embodiments would be readily apparent to one skilled in the art. It is intended that the scope of the present invention extend to all such modifications and/or additions.

What is claimed is:

1. A method for detecting a temporally oscillating source in digital video signals, comprising:
    using an imaging device to capture a sequence of input images of a scene;
    generating digital video signals from the sequence of input images; and
    processing the digital video signals using a recursive Infinite Impulse Response (IIR) filter technique based on a differentiated version of Goertzel's Algorithm to detect a temporally oscillating source in the digital video signals;
    wherein the differentiated version of Goertzel's Algorithm is defined by the equation:

$$W(z) = \frac{1 - z^{-1}}{1 - 2\cos\left(2\pi \frac{f}{f_s}\right)z^{-1} + z^{-2}},$$

where f is the frequency of interest, $f_s$ is the sampling frequency and z is the independent variable of the discrete laplace transform.

2. The method for detecting a temporally oscillating source in digital video signals of claim 1, wherein the imaging device is a video camera.

3. The method for detecting a temporally oscillating source in digital video signals of claim 2, wherein the video camera includes an array of charge-coupled devices (CCDs).

4. The method for detecting a temporally oscillating source in digital video signals of claim 1, wherein a periodicity of the temporally oscillating source is known a priori.

5. The method for detecting a temporally oscillating source in digital video signals of claim 1, wherein processing the digital video signals includes using a frame by frame sliding window technique.

6. The method for detecting a temporally oscillating source in digital video signals of claim 1, wherein processing the digital video signals includes using a block update technique.

7. The method for detecting a temporally oscillating source in digital video signals of claim 1, wherein processing the digital video signals includes using a pixel binning technique.

8. The method for detecting a temporally oscillating source in digital video signals of claim 1, wherein processing the digital video signals includes using a thresholding technique to reduce a signal-to-noise ratio (SNR).

9. The method for detecting a temporally oscillating source in digital video signals of claim 1, further comprising:
    using a confidence scoring metric to locate a detected temporally oscillating source.

10. The method for detecting a temporally oscillating source in digital video signals of claim 9, wherein the confidence scoring metric depends upon the ratio of desired frequency energy to the total energy of the input pixel vector.

11. The method for detecting a temporally oscillating source in digital video signals of claim 1, further comprising:
    using a frame by frame detect and update control loop to track a detected temporally oscillating source.

12. The method for detecting a temporally oscillating source in digital video signals of claim 1, further comprising:
    using an estimated target location to track a detected temporally oscillating source.

13. The method for detecting a temporally oscillating source in digital video signals of claim 1, further comprising:
    using a detection certainty value for a detected temporally oscillating source to control movement of the imaging device.

14. The method for detecting a temporally oscillating source in digital video signals of claim 1, further comprising:
    generating a visual display of the scene including one or more graphical elements at least one of which pertains to a detected temporally oscillating source.

15. method for detecting a temporally oscillating source in digital video signals of claim 14, wherein the one or more graphical elements includes a boundary drawn around the detected temporally oscillating source.

16. The method for detecting a temporally oscillating source in digital video signals of claim 14, wherein the one or more graphical elements includes a field indicating a detection certainty value for the detected temporally oscillating source.

17. The method for detecting a temporally oscillating source in digital video signals of claim 14, wherein the visual display and one or more graphical elements are generated by a graphical user interface (GUI).

18. The method for detecting a temporally oscillating source in digital video signals of claim 17, wherein the GUI is configured to generate a visual representation of a selected source.

19. The method for detecting a temporally oscillating source in digital video signals of claim 18, wherein the visual representation is a Fast Fourier Transform (FFT) display of the selected source.

20. The method for detecting a temporally oscillating source in digital video signals of claim 18, wherein the visual representation is a Signal-to-Noise Ratio (SNR) display for the selected source.

21. The method for detecting a temporally oscillating source in digital video signals of claim 18, wherein the visual representation is a detection certainty level display for the selected source.

22. A system for detecting a temporally oscillating source in digital video signals, comprising:
   an imaging device configured to capture a sequence of input images of a scene and generate digital video signals; and
   a processor configured to process the digital video signals using a recursive Infinite Impulse Response (IIR) filter technique based on a differentiated version of Goertzel's Algorithm to detect a temporally oscillating source in the digital video signals
   wherein the differentiated version of Goertzel's Algorithm is defined by the equation:

$$W(z) = \frac{1 - z^{-1}}{1 - 2\cos\left(2\pi\frac{f}{f_s}\right)z^{-1} + z^{-2}},$$

where f is the frequency of interest, $f_s$ is the sampling frequency and z is the independent variable of the discrete laplace transform.

23. The system for detecting a temporally oscillating source in digital video signals of claim 22, wherein the imaging device is a video camera.

24. The system for detecting a temporally oscillating source in digital video signals of claim 23, wherein the video camera includes an array of charge-coupled devices (CCDs).

25. The system for detecting a temporally oscillating source in digital video signals of claim 22, wherein a periodicity of the temporally oscillating source is known a priori.

26. The system for detecting a temporally oscillating source in digital video signals of claim 22, wherein the processor is configured to process the digital video signals using a frame by frame sliding window technique.

27. The system for detecting a temporally oscillating source in digital video signals of claim 22, wherein the processor is configured to process the digital video signals using a block update technique.

28. The system for detecting a temporally oscillating source in digital video signals of claim 22, wherein the processor is configured to process the digital video signals using a pixel binning technique.

29. The system for detecting a temporally oscillating source in digital video signals of claim 22, wherein the processor is configured to process the digital video signals using a thresholding technique to reduce a signal-to-noise ratio (SNR).

30. The system for detecting a temporally oscillating source in digital video signals of claim 22, wherein the processor is configured to use a confidence scoring metric to locate a detected temporally oscillating source.

31. The system for detecting a temporally oscillating source in digital video signals of claim 30, wherein the confidence scoring metric depends upon the ratio of desired frequency energy to the total energy of the input pixel vector.

32. The system for detecting a temporally oscillating source in digital video signals of claim 22, wherein the processor is configured to use a frame by frame detect and update control loop to track a detected temporally oscillating source.

33. The system for detecting a temporally oscillating source in digital video signals of claim 22, wherein the processor is configured to use an estimated target location to track a detected temporally oscillating source.

34. The system for detecting a temporally oscillating source in digital video signals of claim 22, wherein the processor is configured to use a detection certainty value for a detected temporally oscillating source to control movement of the imaging device.

35. The system for detecting a temporally oscillating source in digital video signals of claim 22, further comprising:
   a graphical user interface (GUI) configured to generate a visual display of the scene including one or more graphical elements at least one of which pertains to a detected temporally oscillating source.

36. The system for detecting a temporally oscillating source in digital video signals of claim 35, wherein the one or more graphical elements includes a boundary drawn around the detected temporally oscillating source.

37. The system for detecting a temporally oscillating source in digital video signals of claim 35, wherein the one or more graphical elements includes a field indicating a detection certainty value for the detected temporally oscillating source.

38. The system for detecting a temporally oscillating source in digital video signals of claim 35, wherein the GUI is configured to generate a visual representation of a selected source.

39. The system for detecting a temporally oscillating source in digital video signals of claim 38, wherein the visual representation is a Fast Fourier Transform (FFT) display of the selected source.

40. The system for detecting a temporally oscillating source in digital video signals of claim 38, wherein the visual representation is a Signal-to-Noise Ratio (SNR) display for the selected source.

41. The system for detecting a temporally oscillating source in digital video signals of claim 38, wherein the visual representation is a detection certainty level display for the selected source.

42. A method for detecting a temporally oscillating source in digital video signals, comprising:
   processing digital video signals using a recursive Infinite Impulse Response (IIR) filter technique based on a differentiated version of Goertzel's Algorithm to detect a temporally oscillating source in the digital video signals; and
   using a graphical user interface (GUI) to generate a visual display including one or more graphical elements at least one of which pertains to a detected temporally oscillating source;

wherein the differentiated version of Goertzel's Algorithm is defined by the equation:

$$W(z) = \frac{1 - z^{-1}}{1 - 2\cos\left(2\pi \frac{f}{f_s}\right)z^{-1} + z^{-2}},$$

where f is the frequency of interest, $f_s$ is the sampling frequency and z is the independent variable of the discrete laplace transform.

43. The method for detecting a temporally oscillating source in digital video signals of claim 42, further comprising:
using an imaging device to capture a sequence of input images of a scene and generate the digital video signals.

44. The method for detecting a temporally oscillating source in digital video signals of claim 42, wherein the imaging device is a video camera.

45. The method for detecting a temporally oscillating source in digital video signals of claim 44, wherein the video camera includes an array of charge-coupled devices (CCDs).

46. The method for detecting a temporally oscillating source in digital video signals of claim 42, wherein a periodicity of the temporally oscillating source is known a priori.

47. The method for detecting a temporally oscillating source in digital video signals of claim 42, wherein processing the digital video signals includes using a frame by frame sliding window technique.

48. The method for detecting a temporally oscillating source in digital video signals of claim 42, wherein processing the digital video signals includes using a block update technique.

49. The method for detecting a temporally oscillating source in digital video signals of claim 42, wherein processing the digital video signals includes using a pixel binning technique.

50. The method for detecting a temporally oscillating source in digital video signals of claim 42, wherein processing the digital video signals includes using a thresholding technique to reduce a signal-to-noise ratio (SNR).

51. The method for detecting a temporally oscillating source in digital video signals of claim 42, further comprising:
using a confidence scoring metric to locate a detected temporally oscillating source.

52. The method for detecting a temporally oscillating source in digital video signals of claim 51, wherein the confidence scoring metric depends upon the ratio of desired frequency energy to the total energy of the input pixel vector.

53. The method for detecting a temporally oscillating source in digital video signals of claim 42, further comprising:
using a frame by frame detect and update control loop to track a detected temporally oscillating source.

54. The method for detecting a temporally oscillating source in digital video signals of claim 42, further comprising:
using an estimated target location to track a detected temporally oscillating source.

55. The method for detecting a temporally oscillating source in digital video signals of claim 43, further comprising:
using a detection certainty value for a detected temporally oscillating source to control movement of the imaging device.

56. The method for detecting a temporally oscillating source in digital video signals of claim 42, further comprising:
generating a visual display of the scene including one or more graphical elements at least one of which pertains to a detected temporally oscillating source.

57. The method for detecting a temporally oscillating source in digital video signals of claim 56, wherein the one or more graphical elements includes a boundary drawn around the detected temporally oscillating source.

58. The method for detecting a temporally oscillating source in digital video signals of claim 56, wherein the one or more graphical elements includes a field indicating a detection certainty value for the detected temporally oscillating source.

59. The method for detecting a temporally oscillating source in digital video signals of claim 56, wherein the visual display and one or more graphical elements are generated by a graphical user interface (GUI).

60. The method for detecting a temporally oscillating source in digital video signals of claim 59, wherein the GUI is configured to generate a visual representation of a selected source.

61. The method for detecting a temporally oscillating source in digital video signals of claim 60, wherein the visual representation is a Fast Fourier Transform (FFT) display of the selected source.

62. The method for detecting a temporally oscillating source in digital video signals of claim 60, wherein the visual representation is a Signal-to-Noise Ratio (SNR) display for the selected source.

63. The method for detecting a temporally oscillating source in digital video signals of claim 60, wherein the visual representation is a detection certainty level display for the selected source.

64. A system for detecting a temporally oscillating source in digital video signals, comprising:
a processor configured to process digital video signals using a recursive Infinite Impulse Response (IIR) filter technique based on a differentiated version of Goertzel's Algorithm to detect a temporally oscillating source in the digital video signals; and
a graphical user interface (GUI) configured to generate one or more graphical elements at least one of which pertains to a detected temporally oscillating source;
wherein the differentiated version of Goertzel's Algorithm is defined by the equation:

$$W(z) = \frac{1 - z^{-1}}{1 - 2\cos\left(2\pi \frac{f}{f_s}\right)z^{-1} + z^{-2}},$$

where f is the frequency of interest, $f_s$ is the sampling frequency and z is the independent variable of the discrete laplace transform.

65. The system for detecting a temporally oscillating source in digital video signals of claim 64, further comprising:
an imaging device configured to capture a sequence of input images of a scene and generate the digital video signals.

66. The system for detecting a temporally oscillating source in digital video signals of claim 65, wherein the imaging device is a video camera.

67. The system for detecting a temporally oscillating source in digital video signals of claim 66, wherein the video camera includes an array of charge-coupled devices (CCDs).

68. The system for detecting a temporally oscillating source in digital video signals of claim 64, wherein a periodicity of the temporally oscillating source is known a priori.

69. The system for detecting a temporally oscillating source in digital video signals of claim 64, wherein the processor is configured to process the digital video signals using a frame by frame sliding window technique.

70. The system for detecting a temporally oscillating source in digital video signals of claim 64, wherein the processor is configured to process the digital video signals using a block update technique.

71. The system for detecting a temporally oscillating source in digital video signals of claim 64, wherein the processor is configured to process the digital video signals using a pixel binning technique.

72. The system for detecting a temporally oscillating source in digital video signals of claim 64, wherein the processor is configured to process the digital video signals using a thresholding technique to reduce a signal-to-noise ratio (SNR).

73. The system for detecting a temporally oscillating source in digital video signals of claim 64, wherein the processor is configured to use a confidence scoring metric to locate a detected temporally oscillating source.

74. The system for detecting a temporally oscillating source in digital video signals of claim 73, wherein the confidence scoring metric depends upon the ratio of desired frequency energy to the total energy of the input pixel vector.

75. The system for detecting a temporally oscillating source in digital video signals of claim 64, wherein the processor is configured to use a frame by frame detect and update control loop to track a detected temporally oscillating source.

76. The system for detecting a temporally oscillating source in digital video signals of claim 64, wherein the processor is configured to use an estimated target location to track a detected temporally oscillating source.

77. The system for detecting a temporally oscillating source in digital video signals of claim 65, wherein the processor is configured to use a detection certainty value for a detected temporally oscillating source to control movement of the imaging device.

78. The system for detecting a temporally oscillating source in digital video signals of claim 64, wherein the one or more graphical elements includes a boundary drawn around the detected temporally oscillating source.

79. The system for detecting a temporally oscillating source in digital video signals of claim 64, wherein the one or more graphical elements includes a field indicating a detection certainty value for the detected temporally oscillating source.

80. The system for detecting a temporally oscillating source in digital video signals of claim 64, wherein the GUI is configured to generate a visual representation of a selected source.

81. The system for detecting a temporally oscillating source in digital video signals of claim 80, wherein the visual representation is a Fast Fourier Transform (FFT) display of the selected source.

82. The system for detecting a temporally oscillating source in digital video signals of claim 80, wherein the visual representation is a Signal-to-Noise Ratio (SNR) display for the selected source.

83. The system for detecting a temporally oscillating source in digital video signals of claim 80, wherein the visual representation is a detection certainty level display for the selected source.

* * * * *